US011477647B1

(12) United States Patent
Srinath Bharadwaj

(10) Patent No.: US 11,477,647 B1
(45) Date of Patent: Oct. 18, 2022

(54) SECURE ELECTRIC VEHICLE CHARGER AND SYSTEM INCORPORATING THEREOF

(71) Applicant: EVE Energy Ventures Inc., New York, NY (US)

(72) Inventor: Nikhil Srinath Bharadwaj, Brooklyn, NY (US)

(73) Assignee: EVE Energy Ventures Inc., New York City, NY (US)

( * ) Notice: Subject to any disclaimer, the term of this patent is extended or adjusted under 35 U.S.C. 154(b) by 0 days.

(21) Appl. No.: 17/646,965

(22) Filed: Jan. 4, 2022

Related U.S. Application Data

(63) Continuation of application No. 17/110,221, filed on Dec. 2, 2020.

(60) Provisional application No. 62/943,085, filed on Dec. 3, 2019.

(51) Int. Cl.
| H04W 12/06 | (2021.01) |
| B60L 53/66 | (2019.01) |
| G05B 15/02 | (2006.01) |
| H04W 12/03 | (2021.01) |
| H04L 9/32  | (2006.01) |

(52) U.S. Cl.
CPC ......... *H04W 12/068* (2021.01); *B60L 53/665* (2019.02); *G05B 15/02* (2013.01); *H04L 9/3263* (2013.01); *H04L 9/3271* (2013.01); *H04W 12/03* (2021.01)

(58) Field of Classification Search
CPC ... H04W 12/068; H04W 12/03; B60L 53/665; H04L 9/3263; H04L 9/3271
USPC .......................................................... 726/9
See application file for complete search history.

(56) References Cited

U.S. PATENT DOCUMENTS

| 6,338,008 B1    | 1/2002  | Kohut et al. |
| 9,348,381 B2 *  | 5/2016  | Khoo .............. B60L 53/67 |
| 10,136,313 B2   | 11/2018 | Minichmayr |
| 10,839,433 B2   | 11/2020 | Khoo et al. |
| 2004/0110044 A1 | 6/2004  | McArthur et al. |

(Continued)

FOREIGN PATENT DOCUMENTS

| WO | 2011109460 A2 | 9/2011 |
| WO | 2012071478 A3 | 11/2012 |
| WO | 2020164909 A1 | 8/2020 |

OTHER PUBLICATIONS

International Search Report and Written Opinion for International Application No. PCT/US2022/070502, Search completed Mar. 28, 2022, dated May 23, 2022, 17 Pgs.

(Continued)

*Primary Examiner* — Bryan F Wright
(74) *Attorney, Agent, or Firm* — KPPB LLP

(57) ABSTRACT

Systems and methods for secure electric vehicle (EV) charging are provided. One embodiment includes an EV charger, where the EV charger includes a power management unit, a processor, a low power short range point-to-point communication system, a memory containing an authentication software application, where the processor is configured by the authentication software application to receive an authentication request from a mobile device via the low power short range point-to-point communication system, send encrypted EV charger access credentials to the mobile device, receive a digital token from the mobile device, verify the digital token, and initiate a charging session based upon a command contained within the digital token.

29 Claims, 22 Drawing Sheets

(56) References Cited

U.S. PATENT DOCUMENTS

| | | | |
|---|---|---|---|
| 2007/0198432 A1 | 8/2007 | Pitroda et al. | |
| 2010/0065627 A1 | 3/2010 | Outwater | |
| 2010/0211643 A1 | 8/2010 | Lowenthal et al. | |
| 2010/0283426 A1 | 11/2010 | Redmann | |
| 2010/0315197 A1 | 12/2010 | Solomon et al. | |
| 2011/0131083 A1 | 6/2011 | Redmann et al. | |
| 2011/0140656 A1 | 6/2011 | Starr et al. | |
| 2011/0140658 A1 | 6/2011 | Outwater et al. | |
| 2011/0213672 A1 | 9/2011 | Redmann et al. | |
| 2011/0213983 A1 | 9/2011 | Staugaitis et al. | |
| 2011/0226848 A1 | 9/2011 | Redmann et al. | |
| 2011/0241824 A1 | 10/2011 | Uesugi | |
| 2012/0053998 A1 | 3/2012 | Redmann et al. | |
| 2012/0191242 A1 | 7/2012 | Outwater et al. | |
| 2012/0221473 A1* | 8/2012 | Redmann | G06Q 20/322 705/50 |
| 2012/0318862 A1 | 12/2012 | Redmann et al. | |
| 2012/0319651 A1 | 12/2012 | Outwater et al. | |
| 2012/0331301 A1 | 12/2012 | Outwater et al. | |
| 2013/0015707 A1 | 1/2013 | Redmann | |
| 2013/0262275 A1 | 10/2013 | Outwater et al. | |
| 2014/0125279 A1 | 5/2014 | Juhasz | |
| 2014/0344026 A1 | 11/2014 | Outwater et al. | |
| 2015/0119019 A1 | 4/2015 | Minichmayr | |
| 2015/0130630 A1 | 5/2015 | Outwater et al. | |
| 2016/0176306 A1 | 6/2016 | Outwater | |
| 2016/0180711 A1 | 6/2016 | Redmann et al. | |
| 2016/0185244 A1 | 6/2016 | Baxter et al. | |
| 2017/0166074 A1 | 6/2017 | Pflaum et al. | |
| 2019/0296560 A1 | 9/2019 | Solomon et al. | |
| 2020/0204010 A1 | 6/2020 | Pettinotto et al. | |
| 2020/0231051 A1 | 7/2020 | Krogh et al. | |
| 2020/0244518 A1 | 7/2020 | Adragna et al. | |
| 2020/0288318 A1 | 9/2020 | Outwater et al. | |
| 2021/0058384 A1 | 2/2021 | Outwater et al. | |

OTHER PUBLICATIONS

United States Court of Appeals for the Federal Circuit, *Chargepoint, Inc.* v. *Semaconnect, Inc.*, Appeal No. 8:17-cv-03717-MJG, Decision dated Mar. 29, 2019, 28 pgs.

"EV Charging Systems, Security Requirements", ElaadNL, European Network for Cyber Security, Version 1.0, Apr. 2016, 52 pgs.

"EVlink Charging Stations, Commissioning Guide", Schneider Electric, Nov. 2019, 52 pgs.

"Improved security for OCPP 1.6-J", Open Charge Alliance, v1.0 FINAL, Nov. 20, 2018, 53 pgs.

Badra et al., "A lightweight security protocol for NFC-based mobile payments", The 7th International Conference on Ambient Systems, Networks and Technologies, Procedia Computer Science, vol. 83, 2016, pp. 705-711, doi: 10.1016/j.procs.2016.04.156.

Chung et al., "Master-Slave Control Scheme in Electric Vehicle Smart Charging Infrastructure", The Scientific World Journal, vol. 2014, No. 462312, May 26, 2014, 14 pages.

Huo et al., "ECC-based RFID/NFC Mutual Authentication Protocol", 2nd International Workshop on Materials Engineering and Computer Sciences (IWMECS), Oct. 2015, 9 pgs., doi: 10.2991/iwmecs-15.2015.31.

Kim et al., "A Secure Charging System for Electric Vehicles Based on Blockchain", Sensors, No. 19, 2019, 22 pgs., doi: 10.3390/s19133028.

Martins et al., "IoT and Blockchain Paradigms for EV Charging System", Energies, No. 12, 2019, 25 pgs., doi: 10.3390/en12152987.

Nashwan, "Secure Authentication Protocol for NFC Mobile Payment Systems", International Journal of Computer Science and Network Security, vol. 17, No. 8, Aug. 2017, pp. 256-263.

Roberts et al., "An Authentication Framework for Electric Vehicle-to-Electric Vehicle Charging Applications", IEEE 14th International Conference on Mobile Ad Hoc and Sensor Systems, 2017, pp. 565-569, doi: 10.1109/MASS.2017.93.

Texas Instruments, "NFC Authentication for an EV Charging Station (Pile) Reference Design", TIDUCF8, Oct. 2016. 32 pgs.

\* cited by examiner

Diagram for authentication process

Firmware update diagram

Diagram for load management

Load management flowchart- mobile device

_US 11,477,647 B1_

SECURE ELECTRIC VEHICLE CHARGER AND SYSTEM INCORPORATING THEREOF

CROSS-REFERENCE TO RELATED APPLICATIONS

The current application is a continuation of U.S. patent application Ser. No. 17/110,221, entitled "Systems and Methods for Secure Electric Vehicle Charging" to Nikhil Srinath Bharadwaj, filed Dec. 2, 2020, which claims priority to U.S. Provisional Patent Application No. 62/943,085, entitled "Power Responsive Integrated Scheduling Model" and filed Dec. 3, 2019, the disclosures of which are incorporated herein by reference in their entirety.

FIELD OF THE INVENTION

The invention generally relates to electric vehicle charging and more specifically relates to systems and methods for secure electric vehicle charging.

BACKGROUND

An incredible amount of infrastructure is relied upon to transport electricity from power stations, where the majority of electricity is currently generated, to where it is consumed by individuals. Power stations can generate electricity in a number of ways including using fossil fuels or using renewable energy sources such as solar, wind, and hydroelectric sources. Substations typically do not generate electricity, but can change the voltage level of the electricity as well as provide protection to other grid infrastructure during faults and outages. From here, the electricity travels over distribution lines to bring electricity to locations where it is consumed such as homes, businesses, and schools. The term "smart grid" describes a new approach to power distribution which leverages advanced technology to track and manage the distribution of electricity. A smart grid can be created by applying upgrades to existing power grid infrastructure including the addition of more renewable energy sources, advanced smart meters that digitally record power usage in real time, and bidirectional energy flow that enables the generation and storage of energy in additional places throughout the electric grid.

Electric vehicles (EVs), which include plug-in hybrid electric vehicles (PHEVs), can use an electric motor for propulsion. EV adoption has been spurred by federal, state, and local government policies providing various incentives (e.g. rebates, fast lanes, parking, etc.). Continued EV adoption is likely to have a significant impact on the future smart grid due to the additional stress load that EVs add to the grid (an EV's power demand can be many times that of an average residential house). Cost inefficiencies in deployment of electrical vehicle supply equipment (EVSE) infrastructure and service panel capacity restrictions can lead to situations where there are too few chargers and too many drivers, which can cut into EV drivers' satisfaction and impede ownership growth rates of EVs.

SUMMARY OF THE INVENTION

Systems and methods for secure electric vehicle (EV) charging are illustrated. One embodiment includes an EV charger, where the EV charger includes a power management unit, a processor, a low power short range point-to-point communication system, a memory containing an authentication software application, where the processor is configured by the authentication software application to receive an authentication request from a mobile device via the low power short range point-to-point communication system, send encrypted EV charger access credentials to the mobile device, receive a digital token from the mobile device, verify the digital token, and initiate a charging session based upon a command contained within the digital token.

In another embodiment, the EV charger's memory includes a digital certificate including cryptographic information.

In a further embodiment, the authentication request from the mobile device includes an encrypted challenge.

In still another embodiment, the EV charger access credentials include charger ID, time of day, and session time.

In a still further embodiment, the verification of the digital token is performed by decrypting the digital token using cryptographic information contained within the digital certificate.

In yet another embodiment, the processor is further configured by the authentication software application to collect charging session data.

In a yet further embodiment, the processor is further configured by the authentication software application to send the charging session data to the mobile device via the low power short range point-to-point communication system.

In another additional embodiment, the charging session data includes duration of the charging session, energy used during the charging session, and a plug-in status.

In a further additional embodiment, the charging session data further includes a status of the EV charger, diagnostics data, temperature data and humidity data.

In another embodiment again, the digital token is bound to a specific time period.

In a further embodiment again, the low power short range point-to-point communication system is a near field communication (NFC) system.

In still yet another embodiment, the processor is configured by the authentication software application to receive a second communication from the user's mobile device via the NFC system.

In a still yet further embodiment, the second communication includes an encrypted message to end the charging session.

In still another additional embodiment, the processor is configured by the authentication software application to decrypt the second communication message and to end the charging session.

In a still further additional embodiment, the EV charger further includes a locking mechanism, and the processor is further configured by the authentication software application to release the locking mechanism upon ending the charging session.

In still another embodiment again, a system for EV charging includes an EV charger where the EV charger includes a power management unit; a processor; a low power short range point-to-point communication system; and a memory including an authentication software application; where the processor is configured by the authentication software application to: receive an authentication request from a mobile device via the low power short range point-to-point communication system; send encrypted EV charger access credentials to the mobile device; receive a digital token from the mobile device; verify the digital token; and initiate a charging session based upon a command contained within the digital token; a mobile device comprising a mobile device processor and a mobile device memory containing a mobile device authentication software application; where the mobile device processor is configured by the mobile device authentication software application to: send an authentication request to the EV charger via the low power short range point-to-point communication system; receive encrypted EV charger access credentials from the EV charger; and send a digital token to the EV charger.

In a still further embodiment again, in the EV charging system, the EV charger processor is further configured by the authentication software application to collect charging session data and to send the charging session data to the mobile device via the low power short range point-to-point communication system.

In yet another additional embodiment, in the EV charging system, the charging session data includes duration of the charging session, energy used during the charging session; plug-in status, status of the EV charger, diagnostics data, temperature and humidity.

In a yet further additional embodiment, the EV charging system further includes a server, where the mobile device processor is configured by the mobile device authentication software application to communicate with the server when a network connection with the server is present.

In yet another embodiment again, in the EV charging system the mobile device processor is configured by the mobile device authentication software application to send the charging session data to the server.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
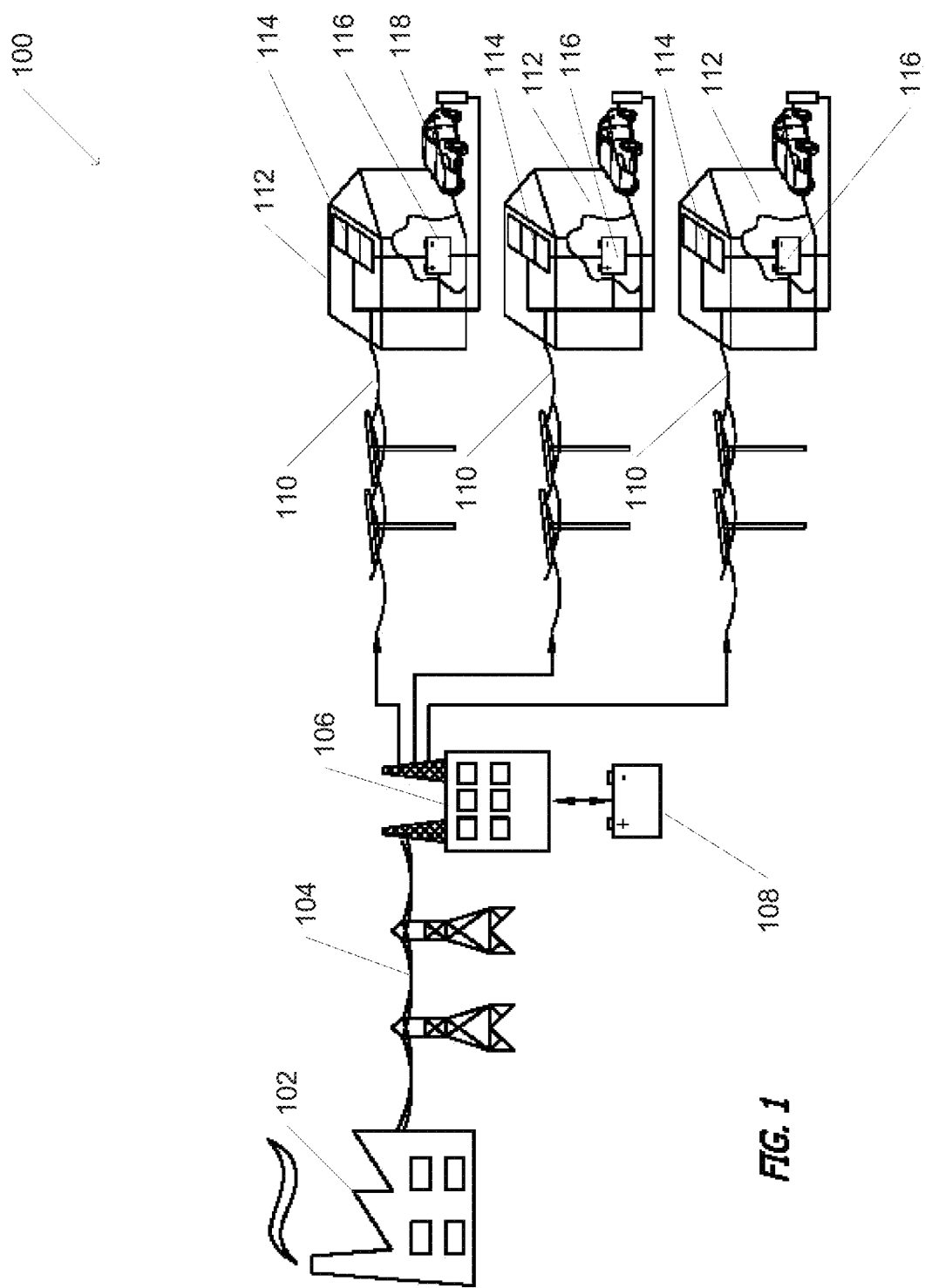
FIG. 1 is a diagram conceptually illustrating a power distribution network in accordance with an embodiment of the invention.

Turning now to the drawings, systems and methods for secure electric vehicle charging in accordance with various embodiments of the invention are illustrated. In numerous embodiments, systems and methods for secure electric vehicle charging can include methods for installing and enabling EV chargers at sites where a network connection is not available. In various embodiments, systems and methods for secure electric vehicle charging can include an electric vehicle supply equipment (EVSE), which can interact with EVs and/or EV drivers' mobile devices via a low power short range point-to-point communication system such as (but not limited to) a near field communication (NFC) system. It will be understood by those skilled in the art the mobile devices can include any of a variety of mobile devices capable of communicating via a wide area network (e.g. a cellular data network) and a low power point-to-point communication system including (but not limited to) wearable mobile devices such as wearable smart watches. In many embodiments, the electric vehicle itself can communicate with an electric vehicle charger directly via a low power short range point-to-point communication system such as (but not limited to) a near field communication (NFC) system. In certain embodiments, systems and methods for secure electric vehicle charging can include an EV charger communicating with an EV via the power charger instead of and/or in addition to using wireless communication.

Deployment of EV chargers in some environments can be challenging since a network connection may not be available in those environments, for example it could be difficult to establish network connections in underground parking garages. Therefore, neither the EV charger nor a mobile device communicating with the EV charger may be able to establish an internet connection at the time the EV charger is attempting to authenticate the mobile device. In some environments, it can be cost prohibitive to bring in a reliable network, for example it can be expensive to bring in a reliable network in rural areas or dense urban. Even if a reliable network can be brought in, the reliability of the network can still be a problem. EV charging companies can lose revenue because of lost charging session data due to unreliable networks causing lost data packets.

In many embodiments, systems and methods for secure electric vehicle charging can include a user authentication process without the need for the presence of a network connection. In certain embodiments, the authentication process can enable an EV operator's mobile device to authenticate itself to an EV charger and enable the EV charger to deliver encrypted access credentials to an EV operator's mobile device via a low power short range point-to-point communication system such as (but not limited to) NFC system, enabling a charging session for the EV without the presence of a network connection. Systems and methods for secure EV charging can, for example, enable a charging session for an electric vehicle where an EV charger may be installed in an underground parking lot, where internet connection may not be available to either the EV charger or the EV operator's mobile device. In many embodiments, systems and methods for secure EV charging can reduce (or eliminate) latency due to network communications. For example, latency in commencing a charging session can be reduced by a factor of 50 by eliminating delays associated with communications between an EV charger and a remote server over a wide area network. In numerous embodiments, systems and methods for secure EV charging can reduce the cost of installation of an EV charger by enabling installation of the EV charger close to a power panel where a network connection may not be available.

In several embodiments, the charging session data can be stored locally on the mobile device when no network connection is available. In many embodiments, systems and methods for secure EV charging can enable buffering of the data transmitted from the EV charger to the mobile device, where the data is stored on the mobile device and is then transmitted to a server once a network connection is restored. In certain embodiments, the data can also include data from previous sessions. In this way, data from multiple charging sessions can be uploaded to the server when a single mobile device establishes a network connection with the server.

In various embodiments, systems and methods for secure EV charging can include a feature where the EV operator's mobile device can communicate with a server in order to obtain an encrypted payload from the server for a charging session. In numerous embodiments, the payload can include data such as name of an EV charger, updated time, an authentication challenge, as well as firmware updates. The payload may also include data to start and stop a charging session, and collect charging session data. In many embodiments, the payload could be bound to a specific time period and/or time slot on a specific EV charger or array of EV chargers. In several embodiments, when a charging session is initiated and a mobile device has communicated with an EV charger, the mobile device can then gain access to an access management system (AMS) residing on a server. In certain embodiments, the EV charger and the EV operator's user identification (user ID) can be verified against a database which is maintained on the server. In many embodiments, when the verification has been successfully completed, an encrypted payload can be sent from the server to the mobile device. In several embodiments, the mobile device can send the encrypted payload to the EV charger via a low power short range point-to-point communication system such as (but not limited to) NFC system in order to initiate a charge. In numerous embodiments, upon completion of the charging session, systems and methods for secure electric vehicle charging can enable an EV operator to end the session by tapping on a user interface of the software application. The charging session data can be retrieved from the EV charger by the mobile device to log the details of the charging session.

In many embodiments, data such as an EV charger location access levels as well as a ledger with available credits and an encrypted payload to start/stop a charging session and the EV operator's user ID can be communicated via the short-range point-to-point communication system and stored locally on the user's mobile device. This data can be updated after every charging session. In several embodiments, pre-downloaded ledger data can enable systems and methods for secure EV charging perform properly without a need for a network connection or where the network connection is unreliable. In certain embodiments, status or authentication levels such as the ledger balance and/or the EV charger location access can be shared with a server, while utilizing a "listener" mode for reconnecting to a user's mobile device over a network or Wi-Fi. In several embodiments, the data verification can be done on an access management system residing on a server in real time if the user's mobile device is online. Upon acceptance of data across all layers, a new payload can be sent in order to enable a charging session. In some embodiments, a reload of balance or credit can be performed over the internet. Systems and methods for secure EV charging can set up a negative debit ledger locally in order to account for the updated balance.

In several embodiments, authentication can be performed against a locally stored data if user's mobile device is offline. The EV charger can be pre-load with a digital certificate. In a number of embodiments, the digital certificate can include cryptographic information such as (but not limited to) a public and private key pair. Upon acceptance of the data, a pre-authorized token can be utilized to enable a charging session. In some embodiments, pre-authorized data may include validity and expiration date such that charging sessions can be limited until the expiration date or until the calculated energy use/cost has been reached. In case a location was added offline or a credit balance is below a threshold, the user has to establish a connection to the server.

In many embodiments, in a shared public setting access can be authenticated by a server, or authenticated locally in order to enable a charging session for a user. In several embodiments, in a private setting the authentication can be performed using an EV operator's user ID and the EV charger's cache. In these settings, the balance/credit authentication can be performed in their entirety. In some embodiments, in a public setting both location and the EV operator's user ID authentication can be bypassed and the balance/credit authentication can be the only verification performed.

In several embodiments, systems and methods for secure EV charging can maintain local intelligence settings that can be updated over several payloads of charging sessions. These local intelligence settings can include location hour settings, pricing per hour or kWh setting, and user ID. In certain embodiments, when an EV charger is in use or reserved by a revolving time-based authorization, the charger may not respond to new charging requests. In some embodiments, a time-based authorization can be performed in order to accept or deny a charging session request if the request is received outside the EV charger's location hours.

In many embodiments, systems and methods for secure electric vehicle charging can deliver firmware updates to an EV charger via multiple communications with one or more mobile devices, each commination carrying a piece of the firmware. In several embodiments, a server can break up the firmware into multiple pieces and send those pieces to an EV operator's mobile device. In certain embodiments, the mobile device can send the firmware pieces to the EV charger via a low power short range point-to-point communication system such as (but not limited to) NFC system by breaking up the firmware into multiple pieces, the pieces are more suitable for transmission via a low power short range point-to-point communication system such as (but not limited to) NFC system, as compared to a complete firmware package which may require higher bandwidth and/or longer communication times than are typically available when communicating via NFC systems. In numerous embodiments, systems and methods for secure electric vehicle charging can deliver power management control information to an EV charger. This can be performed by the EV operator's mobile device sending the power management control information to the EV charger.

In several embodiments, systems and methods for secure electric vehicle charging can include a software application. In certain embodiments, the user interface of the software application includes an "add to wallet" feature. This feature can allow a user to add a token to a digital wallet on a mobile device, thus enabling a charging session in the event of loss of a network connection. In many embodiments the user interface can include a button on a map for quick access to bring up a reader. In numerous embodiments, the user interface can include a "tap to start" and/or "tap to stop" feature. In various embodiments, the software application can include a "charge now" feature where the vehicle can select a charger, an end time, and a payment card on one screen. In many embodiments, the software application can include a "charge later" feature where the software application can display buttons for today/tomorrow booking on a calendar, and auto-select start and end times. In several embodiments, systems and methods for secure electric vehicle charging can utilize a mobile device's local storage to download an encrypted payload ahead of time for accessing chargers in remote areas. In many embodiments, systems and methods for secure electric vehicle charging can utilize a mobile device's local storage to store session log data on the mobile device's memory at the end of session. In several embodiments, the session data can then be sent to the cloud for payment processing. This session log data can include data from sessions involving other mobile devices.

While specific systems and methods for secure electric vehicle charging are described above, any of a variety of different configurations of systems and methods for secure electric vehicle charging can be utilized for EV charging as appropriate to the requirements of specific applications of embodiments of the invention. Electric vehicle power distribution networks and methods of providing power to electric vehicles in accordance with various embodiments of the invention are discussed further below.

Electric Vehicle Power Distribution Networks

A power distribution network in accordance with an embodiment of the invention is shown in FIG. 1. Electricity is generated at power generator 102. Power transmission lines 104 can transmit electricity between the power generator and power substation 106. Power substation 106 additionally can connect to one or more large storage batteries 108, which temporarily store electricity, as well as power distribution lines 110. The power distribution lines 110 can transmit electricity from the power substation to one or more charging stations 112. Charging station 112 can include a battery 114, and/or solar panels 116. Electric vehicles 118 can connect to the charging station and request delivery of power.

The power generator 102 can represent a power source including (but not limited to) those using fossil fuels, nuclear, solar, wind, or hydroelectric power. Substation 106 changes the voltage of the electricity for more efficient power distribution. Solar panels 116 are distributed power generation sources, and can generate power to supply electric charging stations as well as generate additional power for the power grid.

While specific systems incorporating a power distribution network are described above with reference to FIG. 1, any of a variety of systems including secure EV charging can be utilized to provide secure EV charging as appropriate to the requirements of specific applications in accordance with various embodiments of the invention. Systems for secure EV charging in accordance with a number of embodiments of the invention are discussed below.

Systems for Secure EV Charging

Figure 2:
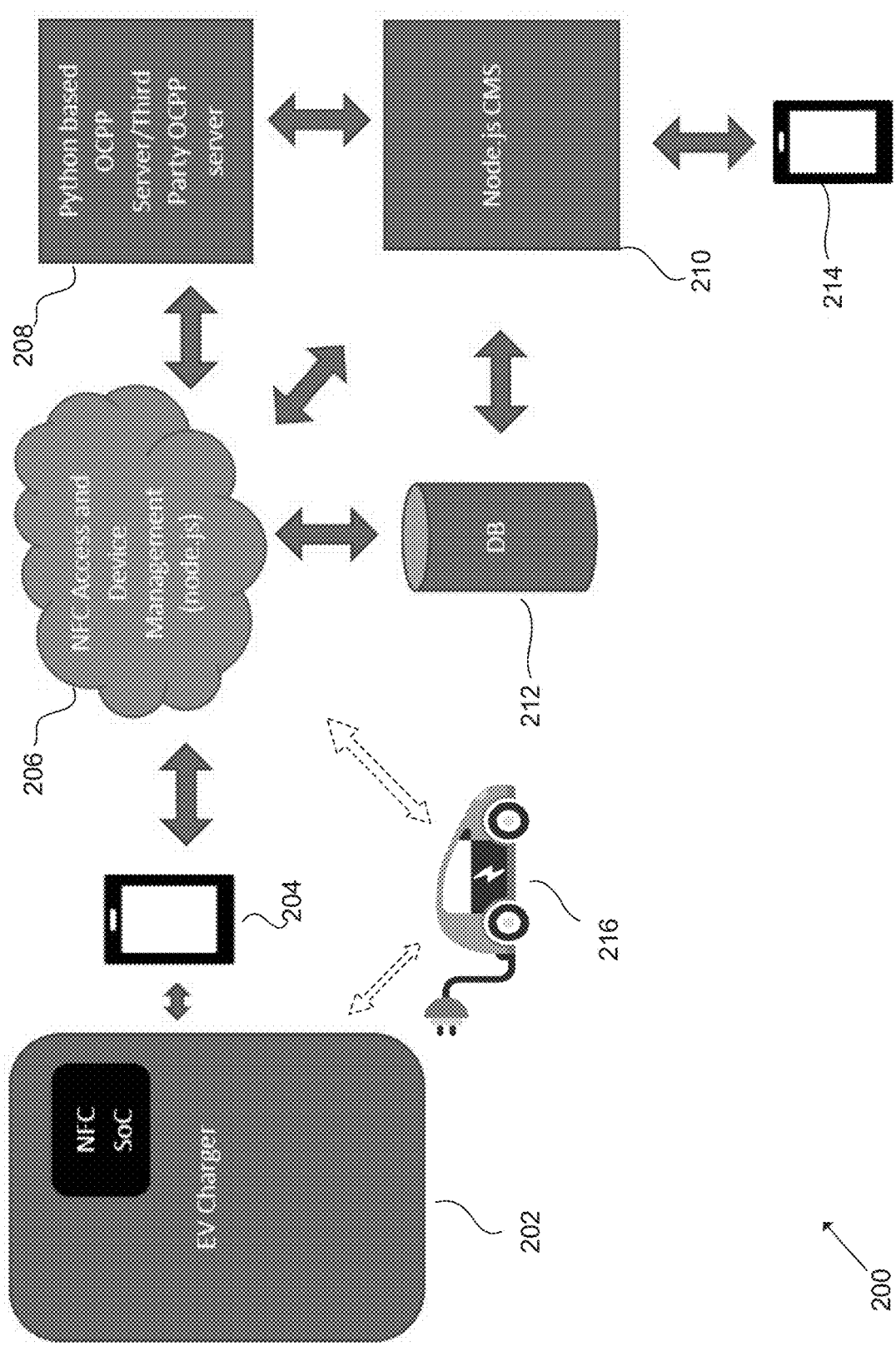
FIG. 2 is a diagram conceptually illustrating systems and methods for secure electric vehicle charging in accordance with an embodiment of the invention.

A system diagram 200 in accordance with an embodiment of the invention is shown in FIG. 2. EV charger 202 can communicate with a user mobile device 204 via NFC. It will be understood by those skilled in the art that user mobile devices can include (but are not limited to) wearable mobile devices such as wearable smart watches. In some embodiments, EV charger 202 can communicate with an electric vehicle 216 instead of mobile device. EV 202 can come with pre-installed NFC or may be retrofitted in the field with the NFC. Mobile device 204 can communicate with an NFC access management 206. Server 208 can include a charging protocol, for example open charge point protocol (OCPP). This protocol enables communication between the server and the users' mobile devices. The access management 206 can communicate to a data base (DB) 212. A central management system (CMS) 210 can communicated with the server 208, the access management 206 and the data base 212. The CMS 210 can also communicate with other mobile devices 214.

A mobile user can tap on a user interface to identify an EV charger 202 to start a charging session. The EV charger 202 can deliver encrypted access credentials to the mobile device 204 via a low power short range point-to-point communication system such as (but not limited to) NFC and/or Bluetooth Low Energy (BLE). The mobile user can then proceed with a charging session with no network connection available. Upon completion of the charging session, the session data can be stored locally on the mobile device 204, which can be sent back to the server when a network connection becomes available. Note that this data can include information concerning other charging sessions and/or information regarding charging sessions involving other EV chargers that share a local area network connection with the EV charger communicating with the mobile device.

If a network connection is available, the mobile device 204 can use the encrypted access credentials to communicate with a server having a management software application 206. The server can verify the mobile user's identification (user ID) and the EV charger 202 against a data base of users and chargers. Upon successful verification of the user ID and the EV charger, an encrypted payload is sent from the server 208 to the mobile device 204. The mobile device 204 can then send the encrypted payload to the EV charger 202 via a low power short range point-to-point communication system such as (but not limited to) NFC system to start a charging session. Upon completion of the charging session, the session data can be stored on the mobile device 204 and sent back to the server 208. This session log data can include data from sessions involving other mobile devices. In many embodiments, the EV charger can be configured to communicate with other EV chargers. When an EV charger is configured in this way, data received by one EV charger can be distributed to other EV chargers. In addition, messages and/or session data provided by one EV charger may have originated at another EV charger.

While specific system for secure EV charging are described above with reference to FIG. 2, any of a variety of systems can be utilized to provide secure EV charging as appropriate to the requirements of specific applications including low power short range point-to-point communication, delivering encrypted access credentials and storing session data in accordance with various embodiments of the invention. Server systems for secure EV charging in accordance with a number of embodiments of the invention is discussed below.

EV Charging Server Systems

Figure 3:
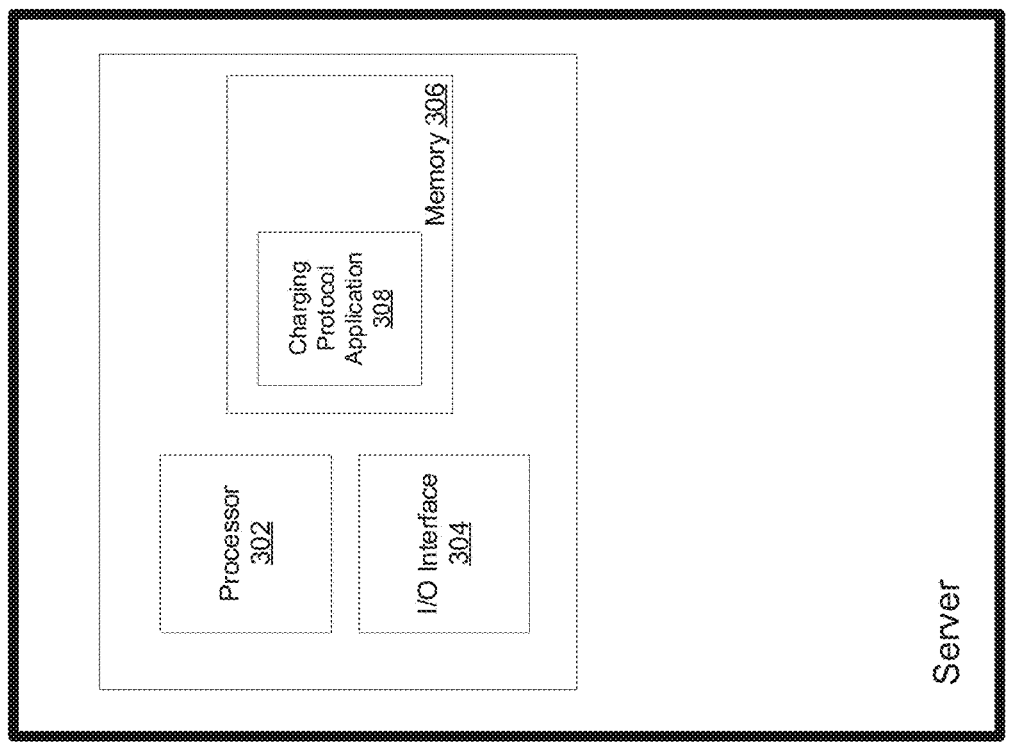
FIG. 3 is a diagram of a server with a charging protocol application used in systems and methods for secure electric vehicle charging in accordance with an embodiment of the invention.

A server system 300 in accordance with an embodiment of the invention is shown in FIG. 3. Server systems in accordance with various embodiments of the invention can include one or more processors 302. The processor 302 can exchange data with memory 306. The processor can communicate through an input/output (I/O) interface 304. The memory 306 can include an EV charging protocol software application 308. The charging protocol software application can enable communication between the server and an access management system. The charging protocol software application can also enable communication between the server and mobile devices. Note that a server system can be implemented using one or multiple physical servers and that different server hardware may provide different servers and/or different servers may respond to sequences of requests from an individual mobile device.

While specific server systems for secure EV charging are described above with reference to FIG. 3, any of a variety of server systems can be utilized to provide secure EV charging as appropriate to the requirements of specific applications including communication between the server and the mobile device in accordance with various embodiments of the invention. Mobile devices configured by an authentication application to communicate securely with EV chargers in accordance with a number of embodiments of the invention is discussed below.

Authentication Applications

Figure 4:
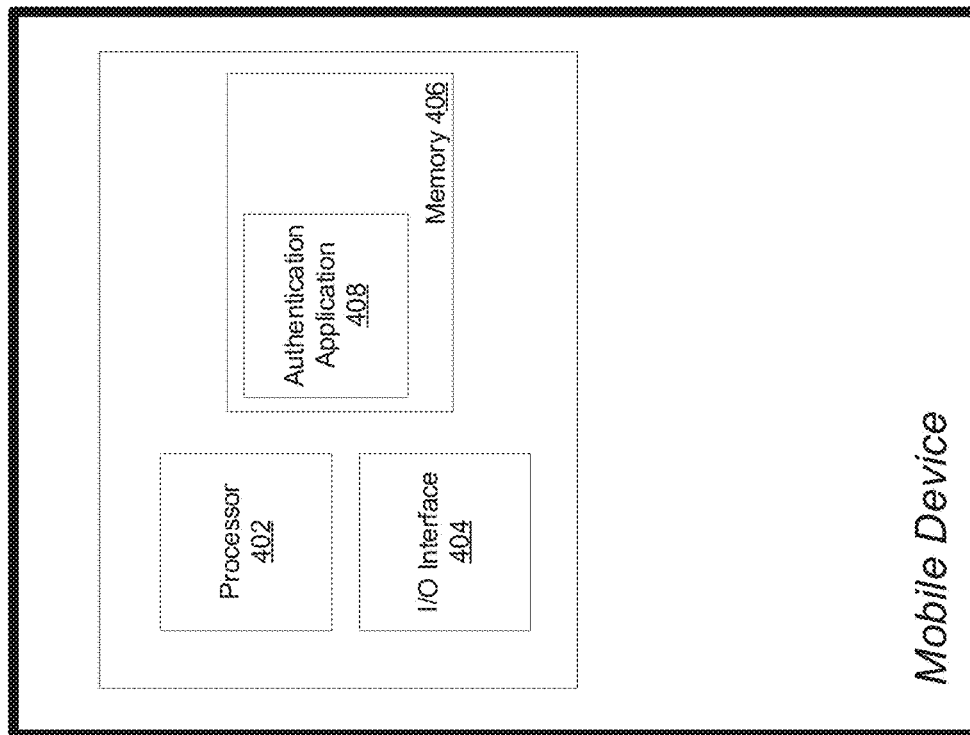
FIG. 4 is a diagram of a mobile device with an authentication application used in systems and methods for electric vehicle charging in accordance with an embodiment of the invention.

A mobile device 400 configured using an authentication application in accordance with an embodiment of the invention is shown in FIG. 4. The mobile device 400 can include one or more processors 402. The processor 402 can exchange data with memory 406. The processor can communicate through an input/output (I/O) interface 404. The memory 406 can include an authentication software application 408. The authentication software can communicate with an EV charger and pass an encrypted payload to the EV charger in order to initiate a charging session. An example of the encrypted payload is shown below:

```
{
//Encryption Challenge here with Secure Element or Cloud based methodology
like
HCE
"driverId": "ae34-fbd-4ybdi-4655-9kmn0"
"locationId": "Accepted",
"changeNFCtagName": " ",
"diagnosticQuery": "Temperature, GFCI".
"firmwareUpdate": " ",
"pricePerhour": " ",
"pricePerkWh: "0.32",
"locationHours: "MMDDYY T — MMDDYY T",
"multipleSessionsperDay": "False",
"maxSessionduration": "12"
"authSetting": Private
},
{
  "chargePointId": "Xeal1",
  "connectorId": 1,
  "csCharging Profiles": {
    "charging ProfileId": "4875db47-392a-40ae-9213-71c59f268b4e",
    "charging ProfileKind": "Absolute",
    "charging ProfilePurpose": "TxProfile",
    "chargingSchedule": {
      "charging RateUnit": "W",
      "chargingSchedulePeriod": [
      {
        "limit": 22000.0,
        "startPeriod": 0
      },
      {
        "limit": 15000.0,
        "startPeriod": 180
      },
```

-continued

```
{
    "limit": 8000.0,
    "startPeriod": 1080
    }
  ],
  "duration": 1980
},
"stackLeve;": 0,
"transactionId": 1,
"validFrom": "2020-08-25T20:12:00+00:00",
"validTo": "2020-08-25T23:30:00+00:00"
}
```

In many embodiments, the mobile device configured to use the authentication application can perform authentication with the EV charger. In several embodiments, the mobile device configured to use the authentication application can present a user interface that enables control of charging using the EV charger. In numerous embodiments, the mobile device configured to use the authentication application can gather log session data from the EV charger. In certain embodiments, the mobile device configured to use the authentication application can provide portions of firmware updates to EV chargers. In many embodiments, the mobile device configured to use the authentication application can communicate with remote server systems including server systems having EV charging access management software.

An authentication process in accordance with an embodiment of the invention can be implemented as discussed below:

Steps of Authentication/Authorization:
1) User presents NFC Tag to initiate charging session
   a. If app is not downloaded and background NFC is used—app store page is loaded
   b. If app is downloaded Certificate check is performed to identify authorized Use
2) If EV Charger is Public and Available to All
   i. EVSE Availability (In-use or location hours) and Health is checked
   ii. A challenge/synchronous or asynchronous encryption/decryption method is utilized to verify security over Secure Element with a crypto-accelerator or over cloud with a method like Host Cloud Emulation
   iii. (No location or Driver ID check is done unless multiple sessions and charging max hour verification is required or if reservations are enabled)
   iv. Balance Check is Completed locally on user device ledger if offline or against AMS Server and DB (phone or car or other personal connected device)
   v. If no payment is required all steps are bypassed and only location hours is verified
   vi. If reservations are enabled the timestamp is also passed for verification and the payload must be pre-downloaded in an online environment
3) If EV Charger is Public and Shared by a Subset of Users
   i. EVSE Availability (In-use or location hours) and Health is checked
   ii. A challenge/synchronous or asynchronous encryption/decryption method is utilized to verify security over Secure Element with a crypto-accelerator or over cloud with a method like Host Cloud Emulation
   iii. Location ID access is verified locally or in real-time with AMS+DB (No Driver ID check is done unless multiple sessions and charging max hour verification is required or if reservations are enabled)
   iv. Balance Check is Completed locally on user device ledger if offline or against AMS Server and DB (phone or car or other personal connected device)
   v. If no payment is required the above step iv is bypassed
   vi. If reservations are enabled the timestamp is also passed for verification and the payload must be pre-downloaded in an online environment
4) If EV Charger is Private: 1:1
   i. EVSE Availability (In-use or location hours) and Health is checked
   ii. A challenge/synchronous or asynchronous encryption/decryption method is utilized to verify security over Secure Element with a crypto-accelerator or over cloud with a method like Host Cloud Emulation
   iii. Location ID access is verified locally or in real-time with AMS+DB (No Driver ID check is done unless multiple sessions and charging max hour verification is required or if reservations are enabled). Alternatively, the Driver ID can be stored locally in the cache of the NFC SoC and this step can be accelerated or bypassed as location check can be avoided.
   iv. Balance Check is Completed locally on user device ledger if offline or against AMS Server and DB (phone or car or other personal connected device)
   v. If no payment is required the above step iv is bypassed
   vi. Reservation not needed in this case
5) In the above steps only the NFC level checks are done in the NDEF payload and the OCPP payload is parsed separately and stored in the SoC. Once above checks are completed the payload is passed to the charger over communication like USB or RS232 as an example. This payload can also hold charging profile data like amperage levels at different intervals for energy management, load management or demand response programs.
6) Charger is turned on
7) During the charging session, energy data and other diagnostic information is recorded and stored locally on the SoC.
8) If a reservation was made the Session termination request over OCPP is also stored locally on the SoC and is initiated at the end time of the session.
9) Driver taps charger again to end session and unplugs vehicle or unplugs vehicle to end session but MUST tap NFC reader again to terminate billing to avoid full charge and to collect session data and diagnostics information. This data can include information like transaction ID, energy dispensed, meter reading (cumulative) to maintain redundancy if data is lost at end of session.

10) Based on duration or energy reading and associated price, the total cost is calculated locally and deducted from the available credits in the local encrypted ledger. This data is passed instantaneously in an online environment or on the next reconnect event on the user's device to update back-end data logs.
11) The SoC will also store N number of session data locally and can be retrieved (potentially by another mobile device) in a forced trigger request if any data is missing.
12) The updated charging session data will be checked against local ledger amount and on a reconnect event the AMS will update logs or permission settings for the user or driver if any changes are detected and the locally stored data is updated as well.

Figure 5:
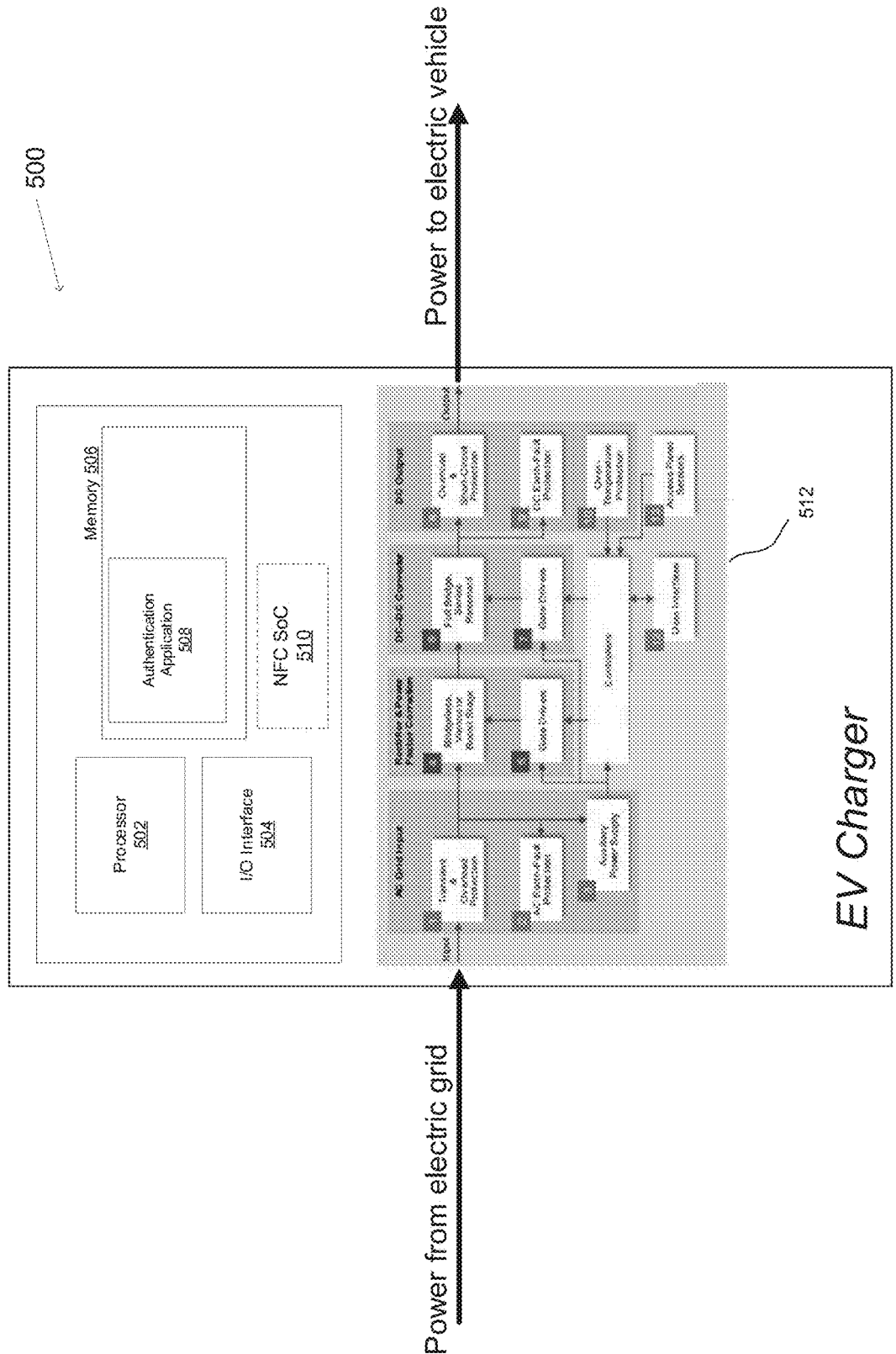
FIG. 5 is a diagram of an EV charger device with an authentication application and an optional near field communication (NFC) used in systems and methods for secure electric vehicle charging in accordance with an embodiment of the invention.

While specific mobile devices that are configured by authentication applications are described above with reference to FIG. 4, any of a variety of mobile devices and/or authentication applications can be utilized to provide secure EV charging as appropriate to the requirements of specific applications including authentication of the mobile device by the EV charger in accordance with various embodiments of the invention. EV chargers that are capable of communicating via low power short range point-to-point communication system such as (but not limited to) NFC and/or Bluetooth Low Energy (BLE) in accordance with a number of embodiments of the invention is discussed below. EV Chargers with Optional Low Power Short Range Point-to-point Communication System such as NFC An EV charger 500 in accordance with an embodiment of the invention is shown in FIG. 5. The EV charger 500 can receive electric power from the grid and includes a power management unit 512 that can convert AC to DC, monitor power connections, and control input and output power flows. The EV charger 500 can include one or more processors 502. The processor can exchange data with memory 506. The processor can communicate through an input/output (I/O) interface 504. The memory 506 can include an authentication software application 508. EV chargers in accordance with many embodiments of the invention can include a low power short range point-to-point communication system such as (but not limited to) NFC and/or Bluetooth Low Energy (BLE). An NFC system-on-chip (SoC) 510 can be optionally installed in the EV charger 500. The authentication software can enable the charger to communicate with a mobile device via the NFC. In a number of embodiments, the EV charger includes a locking mechanism configured to lock the charging cable to an EV. In several embodiments, the EV charger includes one or more wires between the I/O interface 504 and the locking mechanism (not shown) that enables the one or more processors 502 to control the activation and/or release of the locking mechanism. As discussed further below, the ability of the EV charger to control the locking mechanism can encourage users to initiate an interaction between their mobile devices and the EV charger upon completion of a charging session in order to release the locking mechanism. In several embodiments, this interaction enables exchange of charging session data between the EV charger and the mobile device that can then be provided to system servers when a network connection is available to the mobile device.

Figure 6:
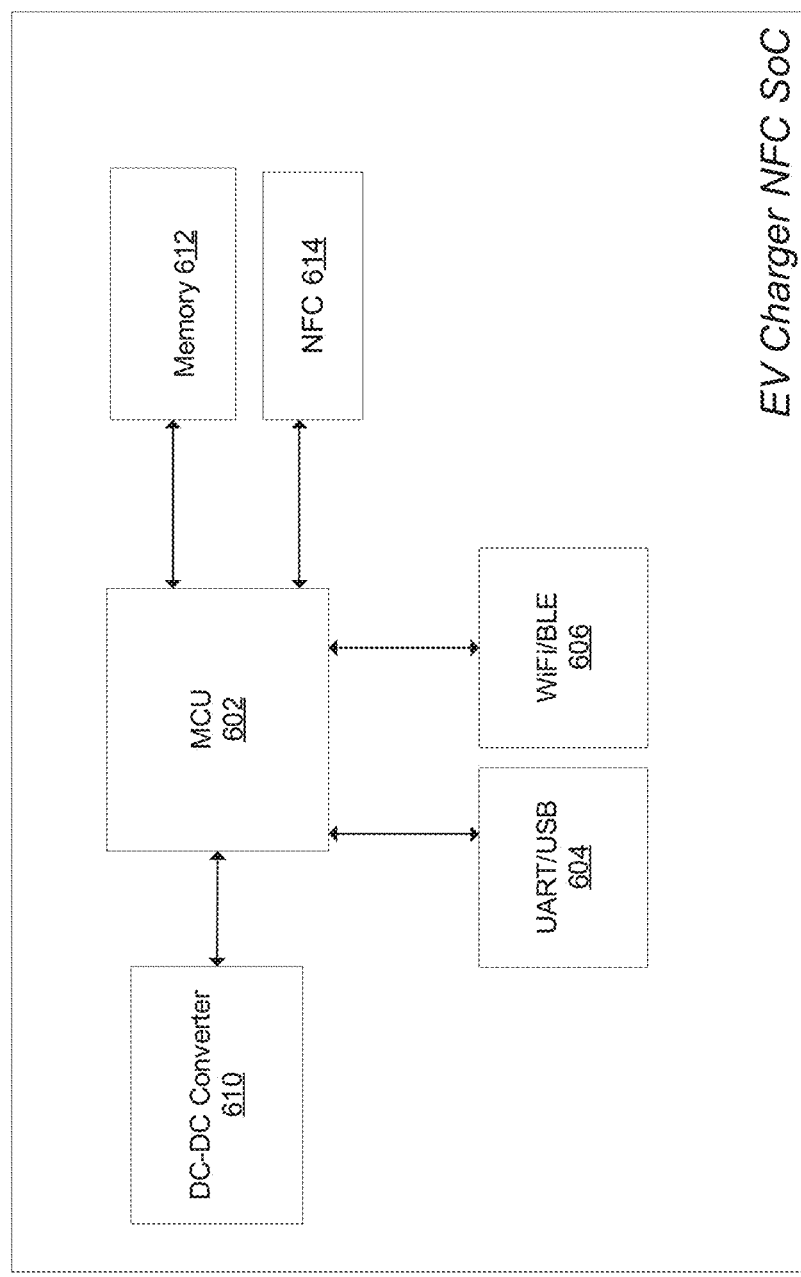
FIG. 6 is a diagram of an EV charger NFC system-on-chip (SoC) in accordance with an embodiment of the invention.

A diagram of an EV charger NFC SoC 600 in accordance with an embodiment of the invention is shown in FIG. 6. The NFC SoC 600 includes a micro-controller unit (MCU) 602. A DC-DC converter 610 can regulate power and provide conditioned power to the MCU and the rest of the circuits. The MCU 602 communicates with a memory 612. The MCU 602 can also control an NFC unit 614. In several embodiments, the MCU 602 also controls a WiFi and/or blue tooth low energy (BLE) unit 606. The MCU 602 can interface with outside circuits through UART/USB unit 604.

In many embodiments, the EV charger can log session data and provide the session data to mobile devices. In several embodiments, the EV charger can receive portions of firmware updates in order to build and deploying complete firmware updates. In numerous embodiments, the EV charger can receive power management information and can adjust charging algorithms based upon the received power management information.

While specific EV chargers and NFC system-on-chip units are described above with reference to FIGS. 5 and 6, any of a variety of EV chargers and NFC SoCs can be utilized to provide secure EV charging as appropriate to the requirements of specific applications including communication between the EV charger and the mobile device via low power short range point-to-point communication systems in accordance with various embodiments of the invention. Authentication processes in accordance with a number of embodiments of the invention are discussed below.
Authentication Processes In many embodiments, systems and methods for secure electric vehicle charging can include a user authentication process without the need for the presence of a network connection. In certain embodiments, the authentication process can enable an EV operator's mobile device to authenticate itself to an EV charger and enable the EV charger to deliver encrypted access credentials to an EV operator's mobile device via a low power short range point-to-point communication system such as (but not limited to) NFC system, enabling a charging session for the EV without the presence of a network connection. In several embodiments, the charging session data can be stored locally on the mobile device when no network connection is available. In many embodiments, systems and methods for secure EV charging can enable buffering of the data transmitted from the EV charger to the mobile device, where the data is stored on the mobile device and is then transmitted to a server once a network connection is restored. In certain embodiments, the data can also include data from previous sessions. In this way, data from multiple charging sessions can be uploaded to the server when a single mobile device establishes a network connection with the server.

In several embodiments, when there is not network present, authentication can be performed against locally stored data. Upon successful authentication, a pre-authorized payload (digital token) can be utilized to enable a session. The pre-authorized data can also pass validity and expiration data, so the charging sessions are limited until expiration date or until the calculated energy use/cost is reached. In case a location was added offline or balance is lower than the limit set, the user must reconnect to update an access management software and database with the most recent data.

Figure 7:
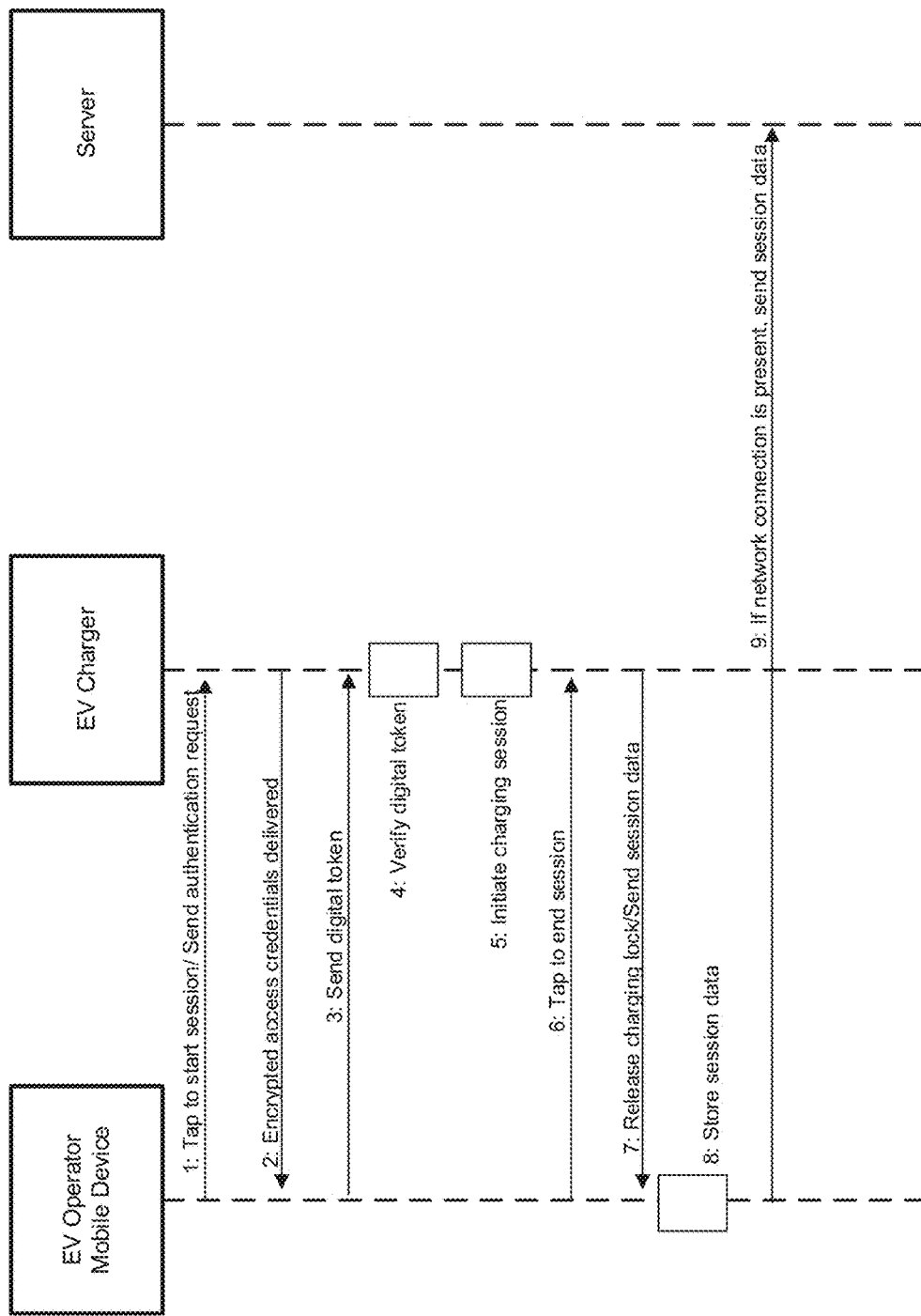
FIG. 7 illustrates an authentication process in accordance with an embodiment of the invention.

An authentication process in accordance with an embodiment of the invention is shown in FIG. 7. The EV operator can tap a start button on a user interface of the software application in order to initiate a charge. In many embodiments, the charging session could be directly initiated on the EV charger when no network connection is present. The mobile device can communicate with the EV charger via a low power short range point-to-point communication system such as (but not limited to) NFC system. The EV charger can proceed to collect one or more unique identifiers for the charging session and authenticate the user. The EV charger can then proceed to deliver encrypted access credentials to the mobile device. In a number of embodiments, the access credentials are utilized by the mobile device to confirm that one or more pre-authorized digital tokens present on the mobile device is capable of activating the EV charger. In several embodiments, the access credentials include an identify of the EV charger and the mobile device confirms that a pre-authorized digital token is authorized for use on the identified EV charger. In certain embodiments, the access credentials include time of use restrictions and the mobile device confirms that the current sessions meets the time of use restrictions and/or that a pre-authorized digital token is authorized for use at the current time and/or for the requested charging duration. As can readily be appreciated, the specific information contained within the access credentials and utilized to confirm that one or more of the pre-authorized digital tokens can be utilized to initialize a charging session are largely only limited by the requirements of a specific application.

The mobile device can then send a pre-authorized digital token to the EV charger, and then the EV charger can initiate a charging session upon successful receipt and decryption of the digital token. The digital token can be encrypted using public keys. In certain embodiment, the digital token is self-authenticating. This process does not require the presence of a network connection. In several embodiments, the digital token includes an encrypted payload that contains a command. In a number of embodiments, the command is formatted in accordance with a protocol such as (but not limited to) the Open Charge Point Protocol. Where the encrypted payload is a command, the EV charger can be configured to respond to the decryption the payload received from the mobile device by executing the command (e.g. a "commence charging session" command). As can readily be appreciated, the specific data provided to the EV charger by the mobile device to initiate and/or control a charging session is largely dependent upon the requirements of specific applications.

At the end of the charging session, the user ideally will end the session by sending an "end charging session" command to the EV charger. In embodiments in which the EV charger has the ability to control a locking mechanism, receipt of the "end charging session" command causes the EV charger to release the locking mechanism of the charging connection. In embodiments in which the EV charger includes a locking mechanism controlled by the EV and both the mobile device and the EV are connected to the Internet, then the mobile device can send a message to a server that can in turn initiates a message to the EV to unlock the locking mechanism when the "end charging session" command is sent to the EV charger. In some embodiments, the EV charger can send an "end charging session" command via a short-range point-to-point communication system to the user's mobile device to be displayed on the user's mobile device or to cause a sense of touch and motion (haptics) on the user's mobile device. In certain embodiments, an EV operator can tap "end" to complete the charging session and to unplug the EV. In this way, the software on the mobile device terminates billing to avoid being charged for a full charging session. In addition, the mobile device can also collect session data and diagnostics information from the EV charger. This data can include information such as (but not limited to) transaction ID, energy dispensed, meter reading (cumulative) to maintain redundancy if data is lost at end of session. In several embodiments, the session data can be stored locally on the mobile device when no network connection is available. In many embodiments, the session data can include duration, session ID/transaction ID, kWh used, details regarding the EV, details regarding maximum amperage for the EV diagnostics, EV operator details, temperature, humidity, charger faults, relay didn't shut off, ventilator, and diagnostics regarding any errors that may have occurred during the charging session. In some embodiments, the session data can include the status of the charging station at the time the charging ended, such as whether the EV was still plugged in or not.

In some embodiments the session data can include data collected by the EV charger during a previous session and provided by the EV charger for forwarding to the server system. In many embodiments, systems and methods for secure EV charging can enable storing of the session data locally on the mobile device. In certain embodiments, the stored data can be transmitted to a server system once a network connection is restored.

In several embodiments, when a network connection is available, the EV operator's mobile device can communicate with a server system and obtain an encrypted payload from the server system. Upon initiation of a charging session, the mobile device communicates with the EV charger. The mobile device can then gain access to an access management system (AMS) residing on a server system, where the EV charger and the EV operator's user identification (user ID) can be verified against a data base which is maintained on the server system. In many embodiments, when the verification has been successfully completed, an encrypted payload for initiating a charge can be passed from the server to the mobile device, where the mobile device can send the encrypted payload to the EV charger via a low power short range point-to-point communication system such as (but not limited to) NFC system in order to initiate a charge. In numerous embodiments, upon completion of the charging session, systems and methods for secure electric vehicle charging can enable an EV operator to end the session by tapping on a user interface of the software application. The session data can be retrieved from the EV charger by the mobile device in order to log the details of the charging session.

Figure 8:
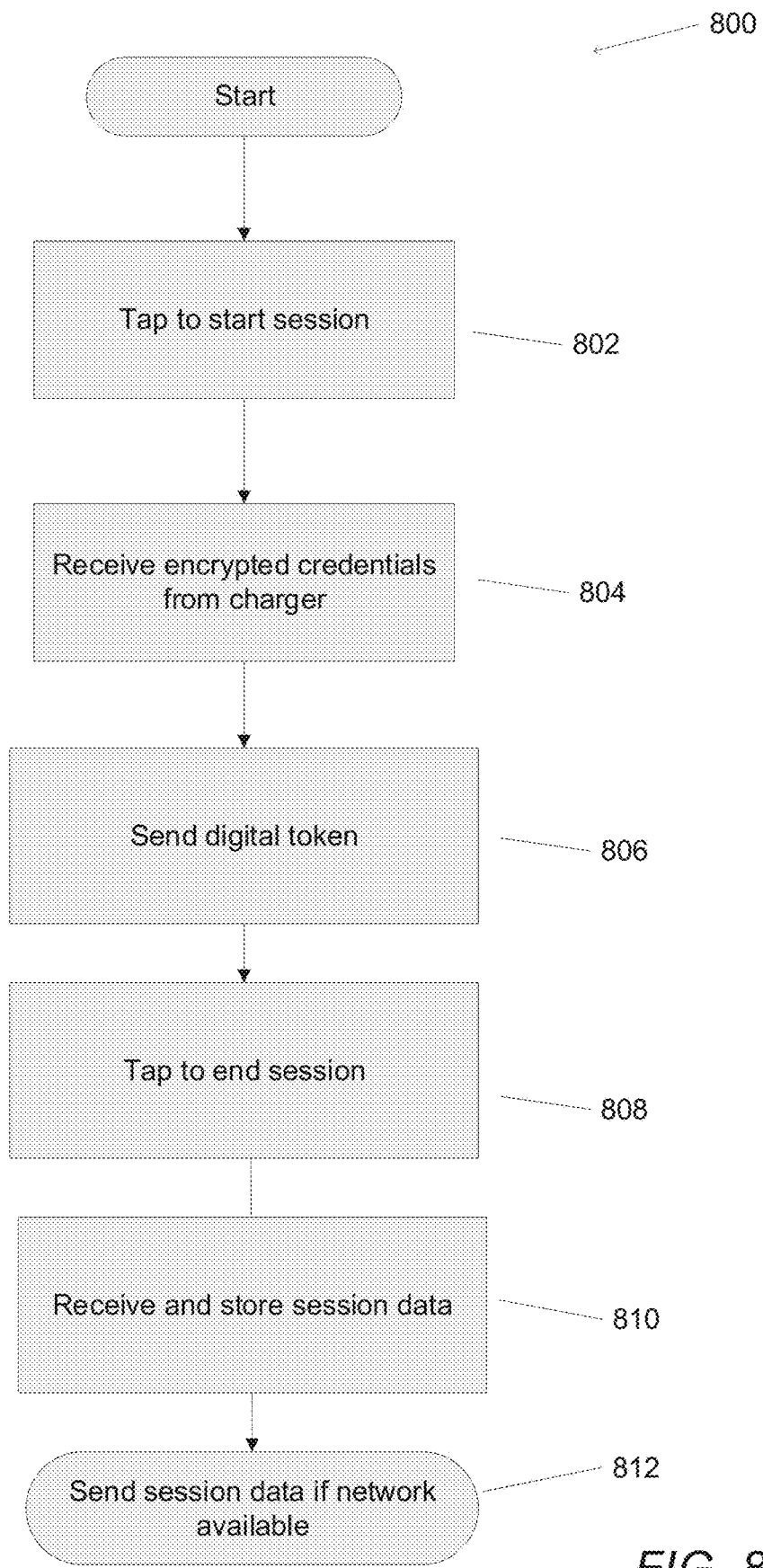
FIG. 8 is a flow chart illustrating an authentication process performed on a mobile device in accordance with an embodiment of the invention.

Turning now to FIG. 8, an authentication process for a mobile device in accordance with an embodiment of the invention is illustrated. Process 800 includes interacting with a user interface to start a charging session (802). Encrypted credentials can be received from the EV charger (804). A digital token can be sent to the EV charger (806). To end the charging session, the user can tap on the user interface to end the session (808). Session data can be received and stored on the mobile device (810). If a network connection is available, the session data can be sent to the server.

Figure 9:
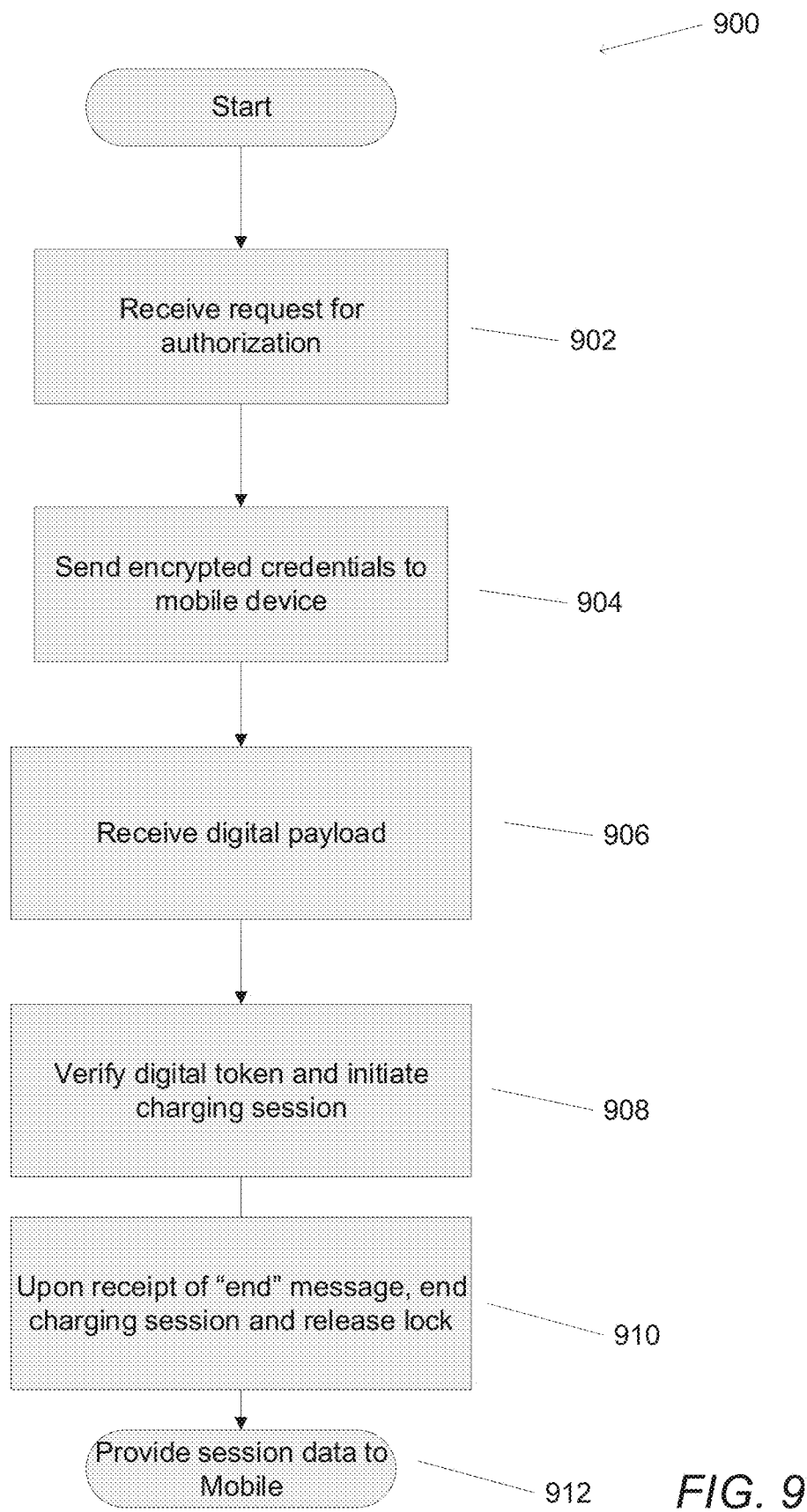
FIG. 9 is a flow chart illustrating an authentication process performed on an EV charger in accordance with an embodiment of the invention.

Turning now to FIG. 9, an authentication process that can be performed by an EV charger in accordance with an embodiment of the invention is illustrated. The process 900 includes receiving a request for authentication (902). Encrypted credentials can be sent to the mobile device (904). A digital token can be received from the mobile device (906). The digital token is verified and a charging session is initiated (908). Upon completion of the charging session, a charging lock can be released (910) and the session data can be provided to the mobile device (912). In many embodiments the session data provided to the mobile device can also include session data from previous charging sessions including charging sessions involving different mobile devices.

Figure 10:
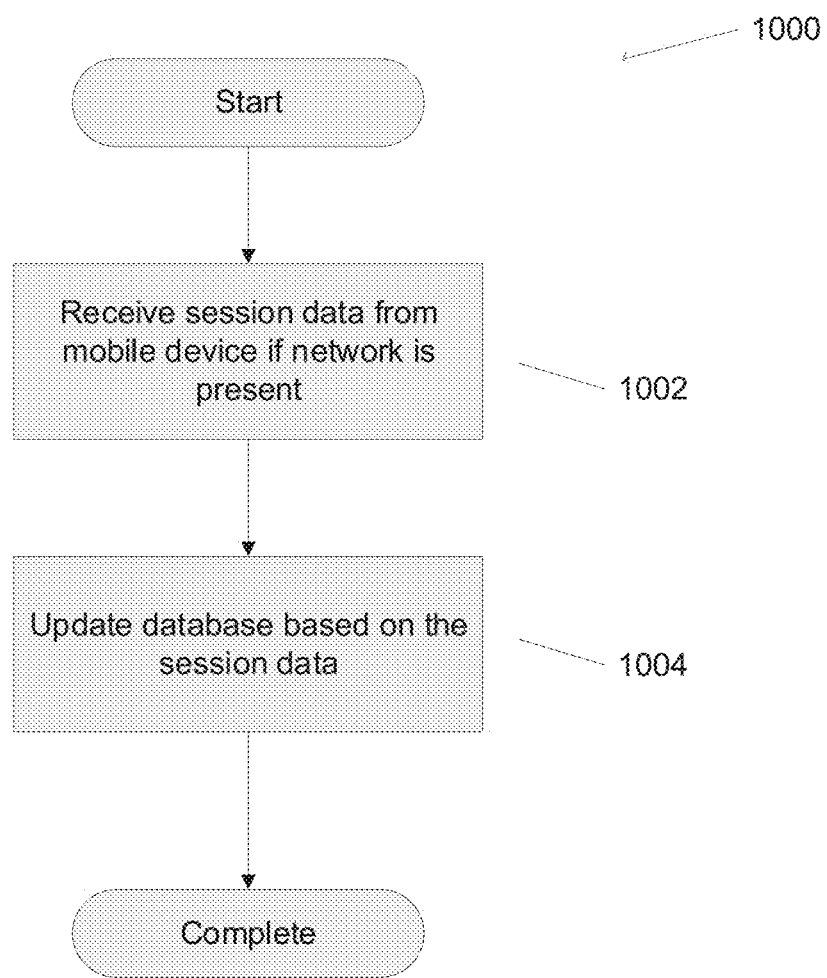
FIG. 10 is a flow chart illustrating an authentication process performed on a server system in accordance with an embodiment of the invention.

Turning now to FIG. 10, an authentication process that can be performed by an EV charging server system in accordance with an embodiment of the invention is illustrated. The process 1000 can include receiving session data from the mobile device if a network connection is present (1002). The database can be updated based on the session data (1004). An encrypted payload can be passed to the mobile device for initiating a charging session (1006). In many embodiments, the mobile device could maintain a data connection and provide the session data. In several embodiments, where the mobile device is disconnected during the charging session, the mobile device can establish a network connection at a later time and provide the session data at that time. In addition, the data can be provided to an alternative mobile device, which in turn can provide the session data to the server system once it can establish a connection.

While specific authentication processes are described above with reference to FIGS. 7-10, any of a variety of authentication processes can be utilized to provide secure EV charging as appropriate to the requirements of specific applications including collecting one or more unique identifiers for the charging session and authenticating the user in accordance with various embodiments of the invention. Revolving time-based authentication processes in accordance with a number of embodiments of the invention are discussed below.

Revolving Time-Based User Authentication

In many embodiments, systems and methods for secure EV charging can include a time-based user authentication. In many embodiments, time-based user authentication can be performed by collecting unique identifier of a mobile device requesting for a charging session. In several embodiments, the requested start and end times can be matched with an interval-based service run that only displays the "Auth request" button on the user interface within a timed interval for that user's start (S) and end interval maintained in a local time zone.

Figure 11:
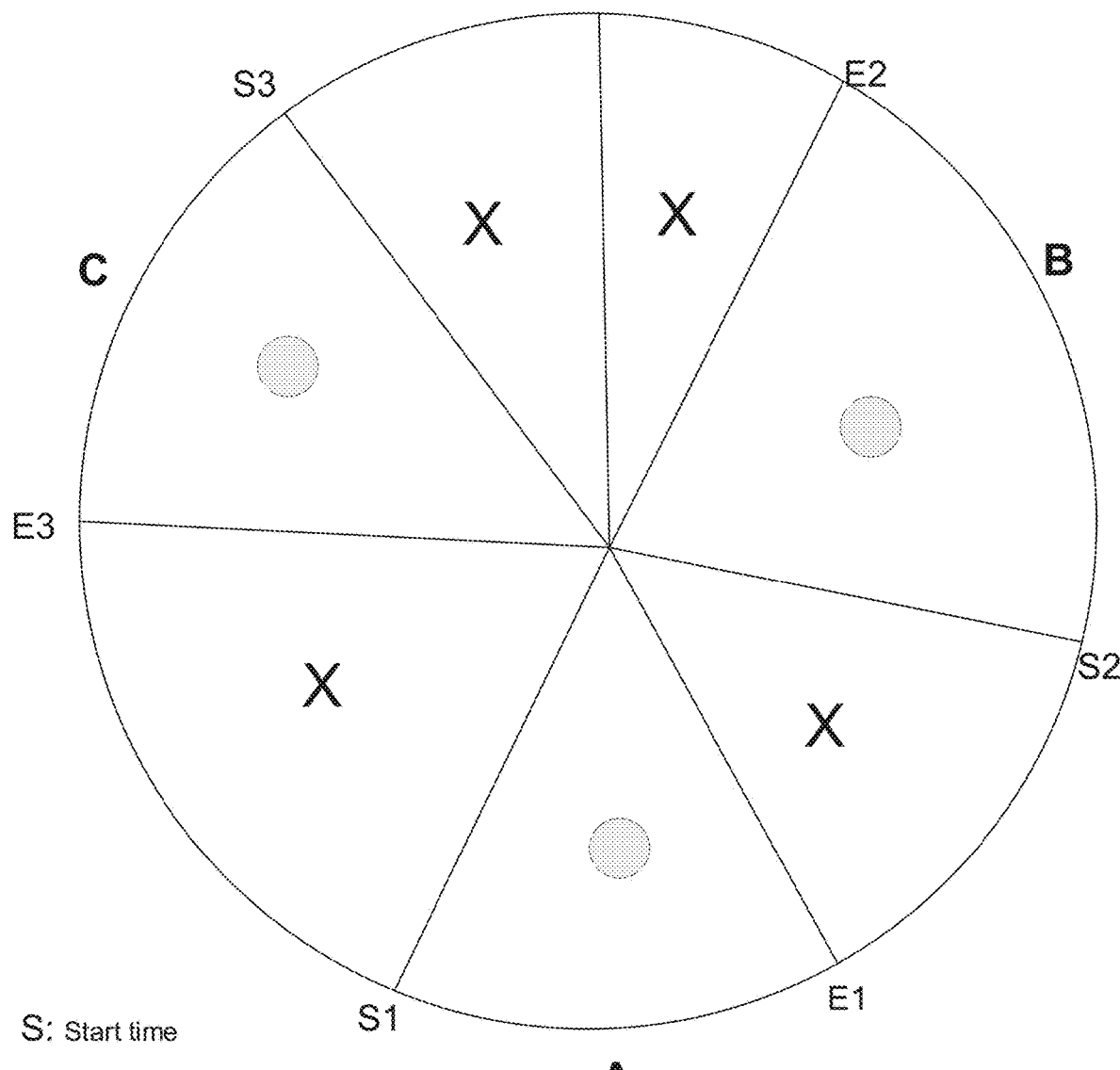
FIG. 11 shows a revolving authentication diagram of scheduled sessions in accordance with an embodiment of the invention.
Figure 12A:
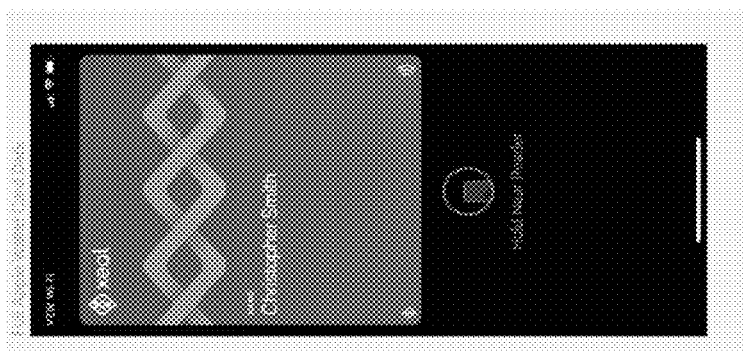
FIGS. 12A-12D show screen shots of a user interface of an application used in systems and methods for secure electric vehicle charging in accordance with an embodiment of the invention.
Figure 12B:
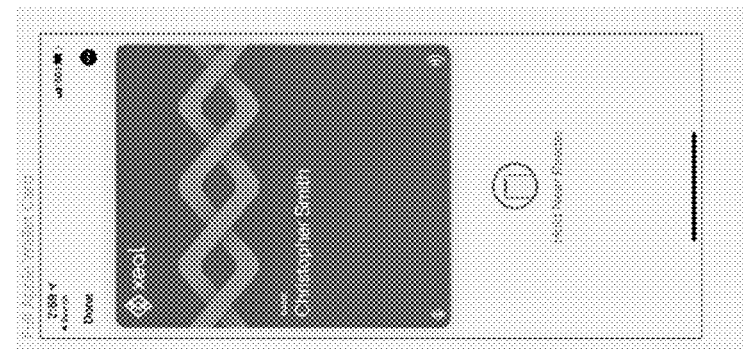
Figure 12C:
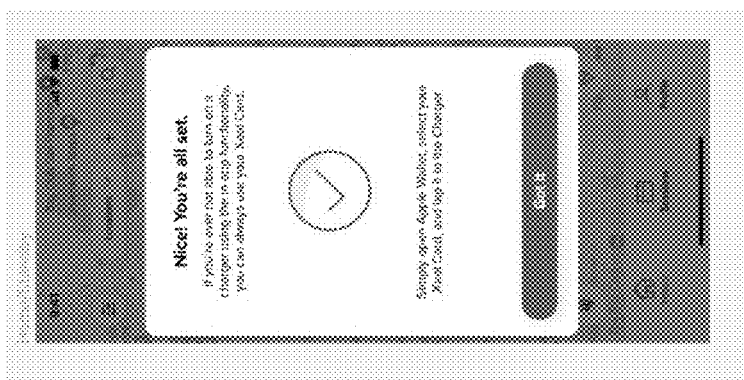
Figure 12D:
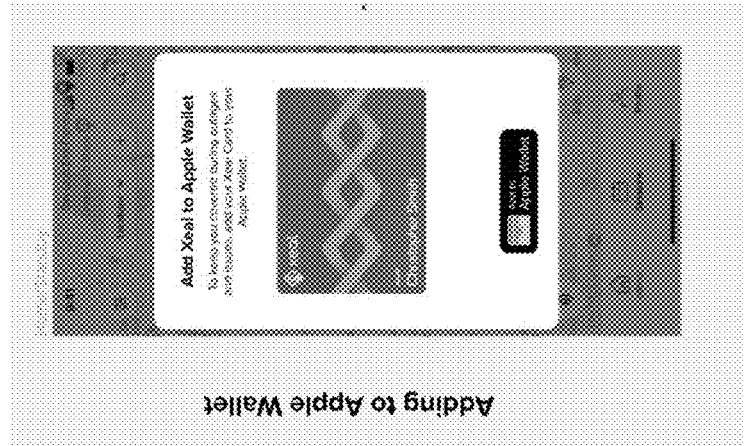

The authentication and session start command between the EV operator and the EV charger can be inserted into a dynamic revolving timescale between 0 to 24 hours in 15-minute interval gaps. A set of charging sessions are received from different EV operators requesting charging sessions. The authorization command on a user interface is made visible through for each reserved session unique to the user between start and end of the interval. The same logic is applicable to abort charging. A revolving time-based user authentication process in accordance with an embodiment of the invention is conceptually illustrated in FIG. 11. FIG. 11 shows three users (A, B, C) having three intervals (S1-E1, S2-E2, S3-E3), during which time the "Authorization" button becomes visible on the user interface of the software application.

While specific time-based authentication processes are described above with reference to FIG. 11, any of a variety of time-based authentication processes can be utilized to provide secure EV charging as appropriate to the requirements of specific applications including authentication between the EV operator and the EV charger based on a revolving timescale in accordance with various embodiments of the invention. User interfaces for software applications in accordance with a number of embodiments of the invention are discussed below.

Authentication Application User Interfaces

Figure 13B:
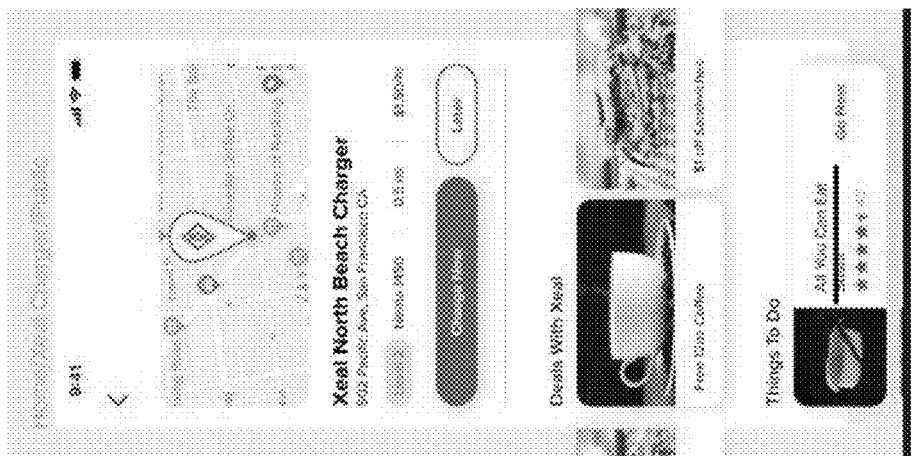
FIGS. 13A-13B show screen shots of a user interface of an application used in systems and methods for secure electric vehicle charging showing a map with public charger location and availability in accordance with an embodiment of the invention.
Figure 13A:
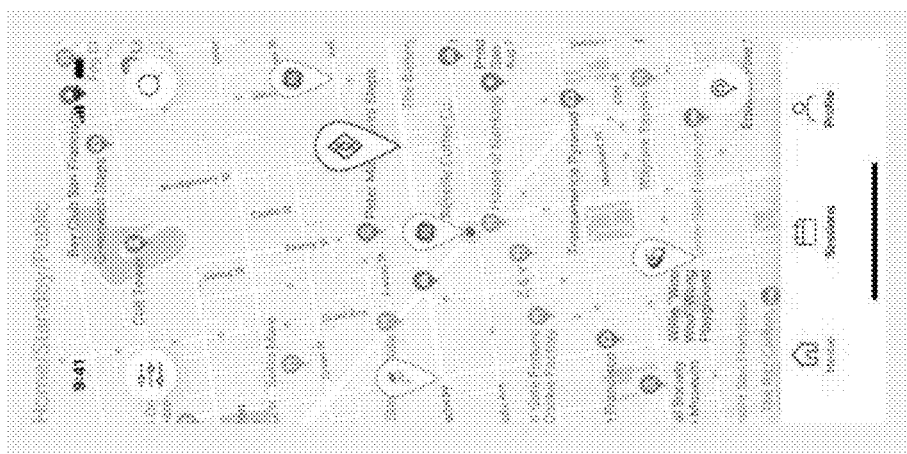
Figures 14A, 14B:
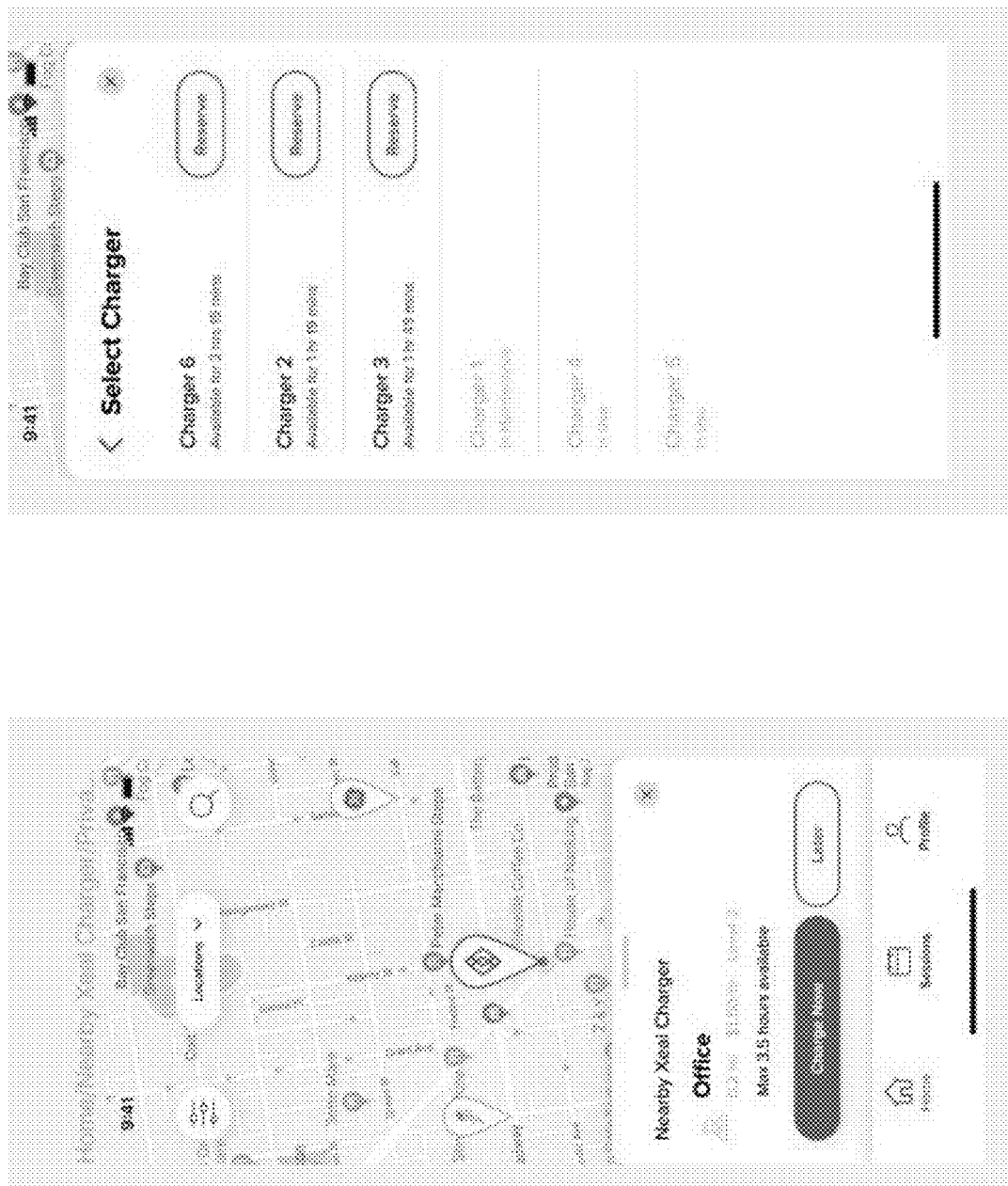
FIGS. 14A-14B show screen shots of a user interface of an application used in systems and methods for secure electric vehicle charging showing a map with private charger location and availability in accordance with an embodiment of the invention.

In many embodiments, systems and methods for secure EV charging can include a software application. The software application on an EV operator's mobile device can include a user interface. FIGS. 12A-12D show an embodiment of a user interface for an authentication application that can be installed on a mobile device, where the user interface enables an EV operator to interact with the software application in order to find a charger, and start and end a charging session. A token can be added to a digital wallet on a mobile device as shown in FIGS. 12A-12D. Once a token has been added to the digital wallet on the mobile device, a charging session can be started without the presence of a network connection. FIGS. 13A-13B show an embodiment of a user interface for an authentication application in accordance with an embodiment of the invention, where locations of public charges are displayed on a map, and the user can select a charger from the displayed map. FIGS. 14A-14B show an embodiment of a user interface for an authentication application in accordance with an embodiment of the invention, where locations of private chargers are displayed on a map, and the user can select a charger from the displayed map.

While specific embodiments of user interfaces for authentication applications are described above with reference to FIG. 11, any of a variety of user interfaces can be utilized within authentication applications as appropriate to the requirements of specific applications including adding a token to a digital wallet and starting a charging session without the presence of a network connection in accordance with various embodiments of the invention. Firmware update processes in accordance with a number of embodiments of the invention are discussed below.

Firmware Update Processes

Figure 15:
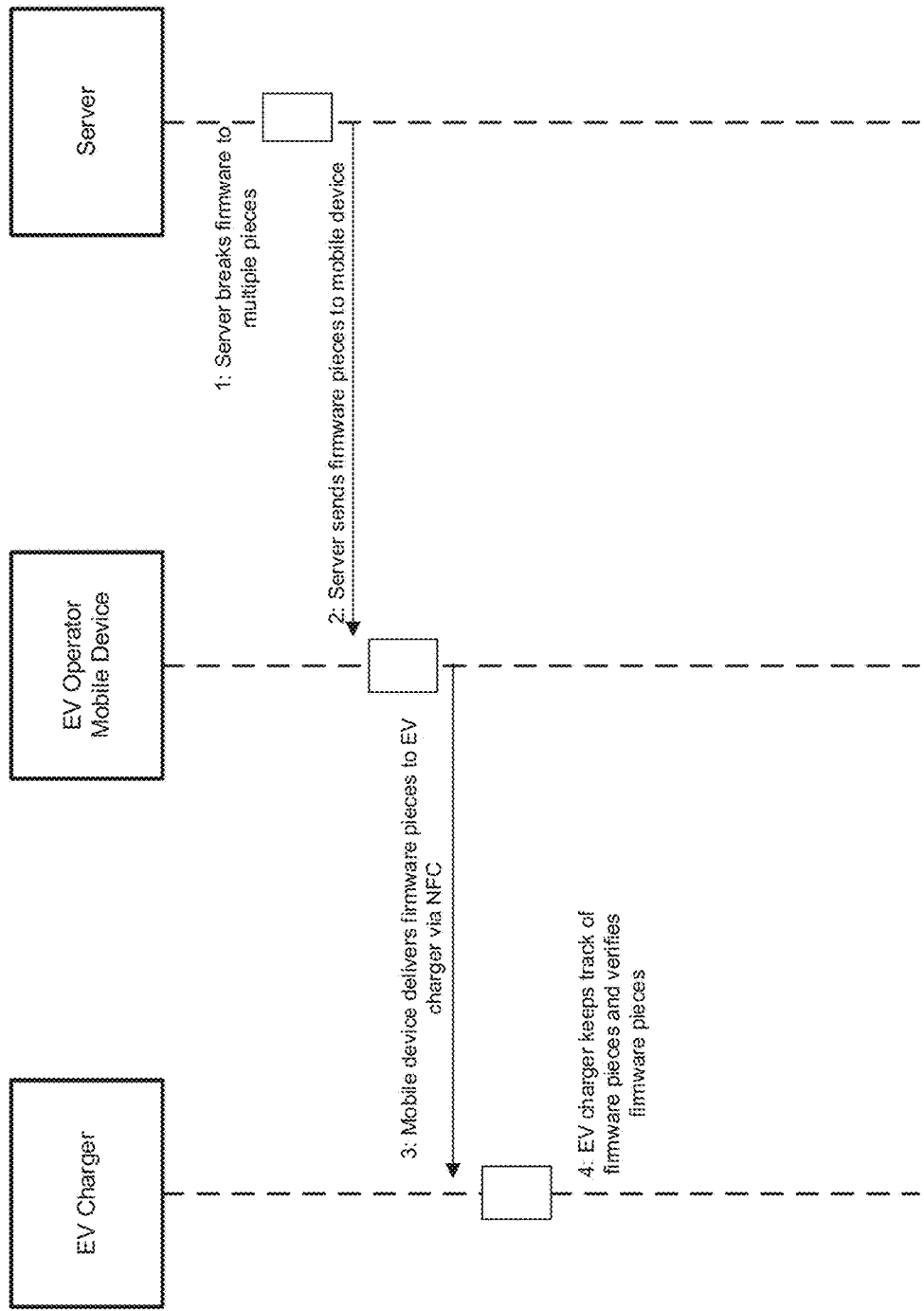
FIG. 15 illustrates a firmware update process in accordance with an embodiment of the invention.

A firmware update process in accordance with an embodiment of the invention is shown in FIG. 15. In several embodiments, the EV charging server system can break up the firmware into multiple pieces and send one or more of those pieces to an EV operator's mobile device, where the mobile device can deliver the received firmware pieces to an EV charger via multiple a low power short range point-to-point communication system such as (but not limited to) NFC system. The pieces of the firmware are suitable for transmission via a low power short range point-to-point communication system such as (but not limited to) NFC system, as compared to a complete firmware which may require high bandwidth. Note that different pieces can come from different mobile devices and/or during different sessions. The EV charger can keep track of the pieces of the firmware to assure the firmware's integrity.

Figure 16:
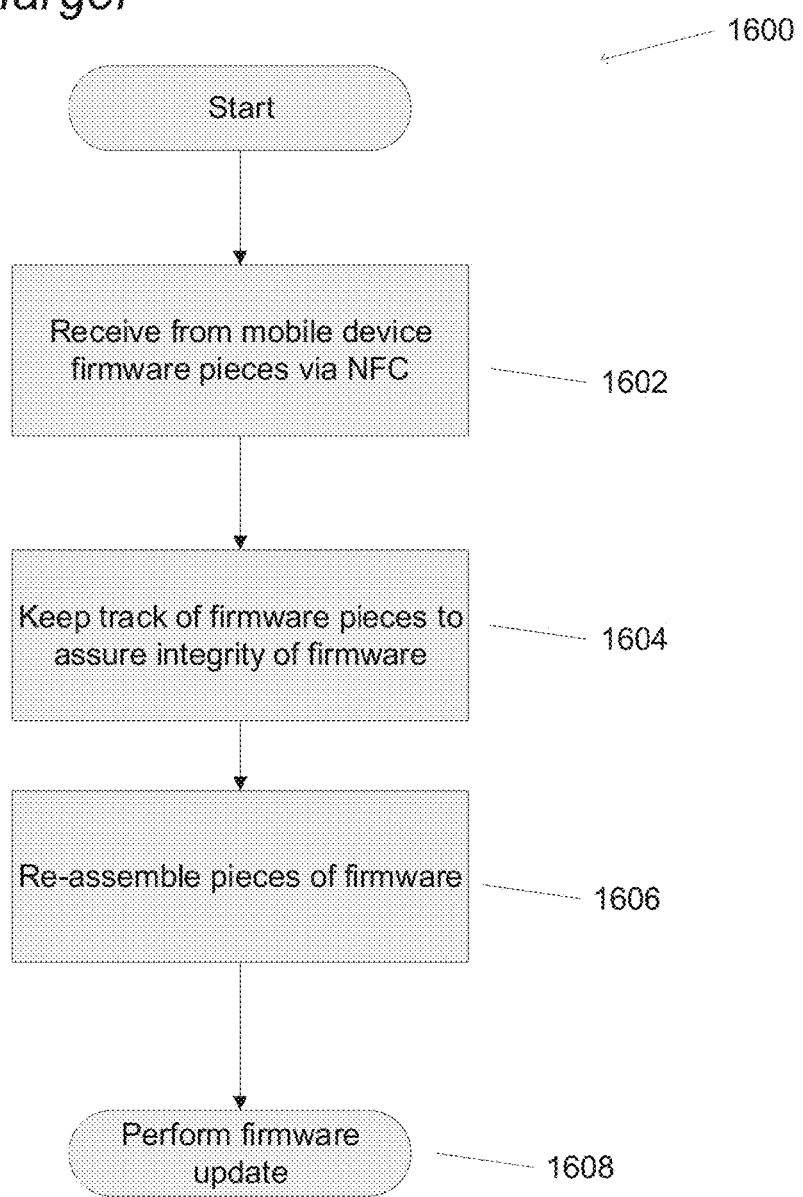
FIG. 16 is a flow chart illustrating a firmware update process performed by an EV charger in accordance with an embodiment of the invention.

Turning now to FIG. 16, a firmware update process for an EV charger in accordance with an embodiment of the invention is illustrated. Process 1600 includes receiving one or more pieces of the firmware via multiple NFC communications with a mobile device (1602). The EV charger can keep track of the firmware pieces to assure integrity of the firmware (1604). The EV charger reassembles the pieces of firmware (1606) and performs firmware update (1608).

In several embodiments, firmware update can be performed over multiple charging session. In many embodiments, the firmware update can include encrypted start and end bits. In numerous embodiments, the firmware update can perform checksum verification. In certain embodiments, the firmware update can be initiated outside charging hours or when the EV charger is available and/or during low utilization periods. In some embodiments, the firmware update can include clear, reset, and trigger confirmation messages.

Figure 17:
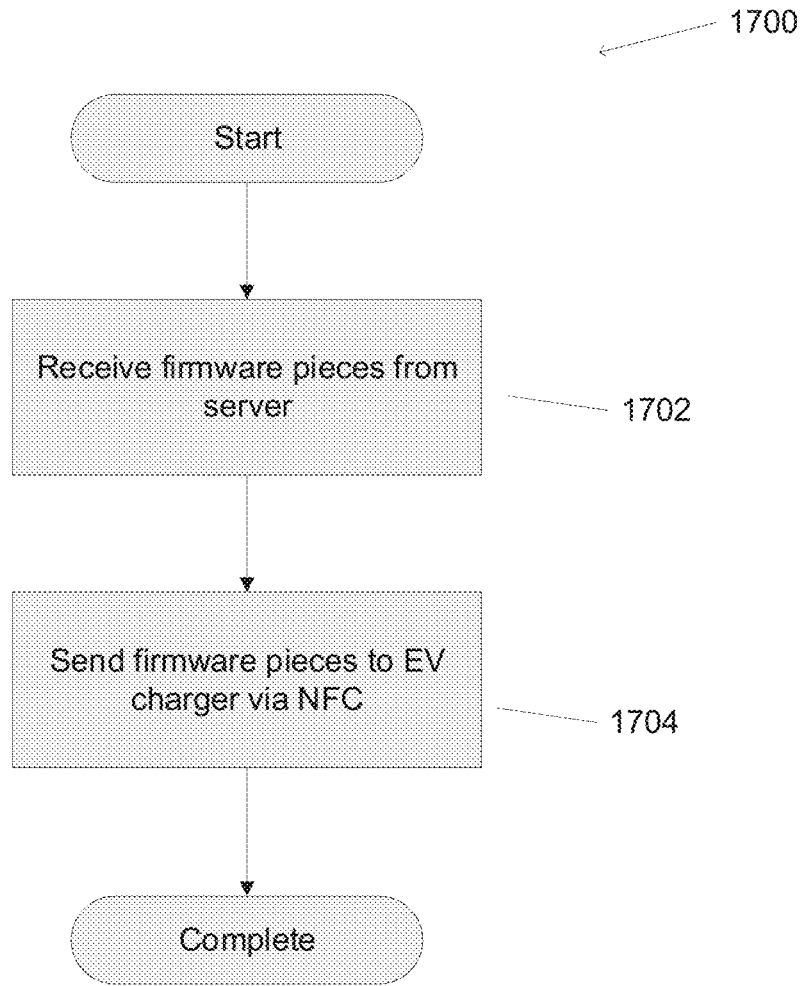
FIG. 17 is a flow chart illustrating an EV charger firmware update process performed by a mobile device in accordance with an embodiment of the invention.

Turning now to FIG. 17, a process for delivering portions of a firmware update to an EV charger using a mobile device configured by an authentication application in accordance with an embodiment of the invention is illustrated. In many embodiments, a checksum can be performed. Process 1700 includes receiving pieces of the firmware from the server system (1702). The firmware pieces are sent to the EV charger via NFC (1704). In many embodiments, the EV charger can get components of the firmware and then send a confirmation. In some embodiments, the EV charger can either perform the firmware update or can get a command for firmware update.

Figure 18:
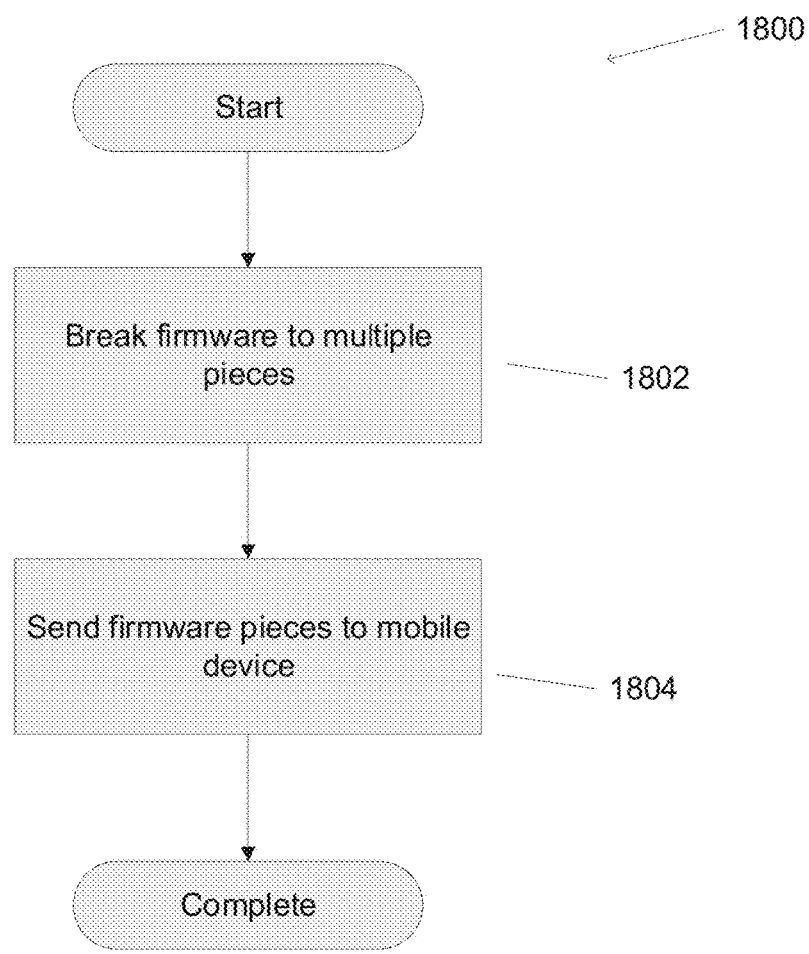
FIG. 18 is a flow chart illustrating an EV charger firmware update process performed by a server system in accordance with an embodiment of the invention.

Turning now to FIG. 18, a firmware update process for a server system in accordance with an embodiment of the invention is illustrated. Process 1800 includes breaking the firmware into multiple pieces (1802). At least one of the multiple pieces of the firmware are sent to the mobile device (1804). In several embodiments, a checksum can be performed. In certain embodiments, the server can send firmware updates when the EV charger is available.

While specific firmware update processes are described above with reference to FIGS. 15-18, any of a variety of firmware update processes can be utilized to deliver firmware updates to EV chargers as appropriate to the requirements of specific applications including firmware update via short range point-to-point communication system in accordance with various embodiments of the invention. Load management processes in accordance with a number of embodiments of the invention are discussed below.

Load Management Processes

Figure 19:
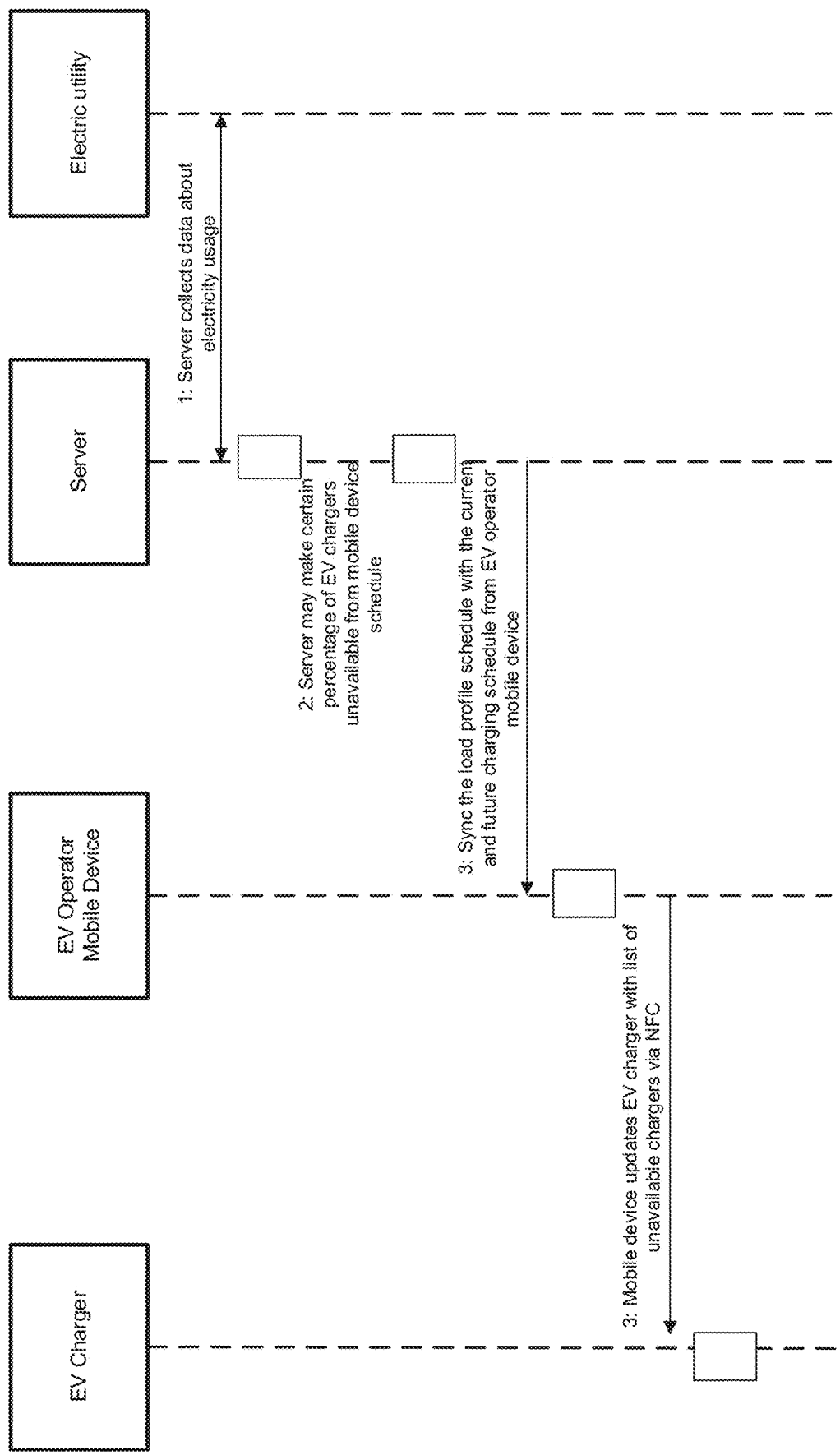
FIG. 19 illustrates a load management process in accordance with an embodiment of the invention.

A load management process in accordance with an embodiment of the invention is shown in FIG. 19. In several embodiments, the server system can collect data about electricity usage. Based on the collected data, the server system can make a certain percentage of EV charger unavailable from the mobile device schedules. The server system can then synchronize with EV operator's mobile device the electricity load profile including the current and future charging schedules. The EV operator's mobile device can then update the EV charger with a list of unavailable chargers via NFC. In many embodiments, systems and methods for secure EV charging can restrict the amount of power that can be drawn from an EV charger to some point up to maximum power available on that EV charger in order to control total power consumption.

In some embodiments, the server system can keep track of on the total amperage. In certain embodiments, the amperage can be set as multiples, for example 15 A or 30 A. In several embodiments, data can be collected frequently, for example in 15-minute intervals. In numerous embodiments, data for a building can be based on 24-hour usage across the building. The peak charging times (which can be the most expensive) for the next 48 hours can be calculated using the previous 24-hour data and displayed on the EV operators' mobile devices in a single calendar view across all EV chargers. The scheduled time on EV operators' mobile devices can allow the EV operators to have complete transparency into peak charging times and may lead to slower charging times or surge pricing. In some embodiments, when case energy management is activated, sessions during these identified times can have a separate load profile sent by the server system to supersede default charging amperage, and increased charging times can be displayed to the EV operators.

Figure 20:
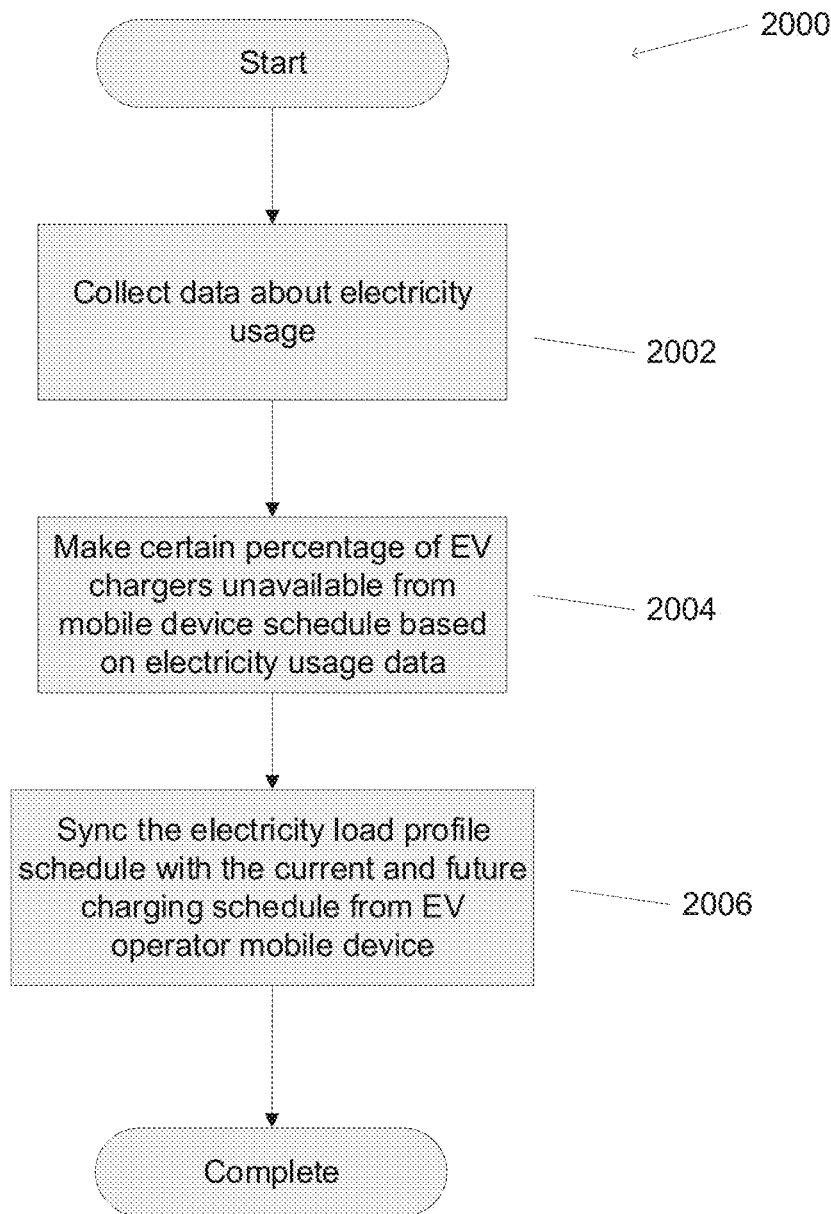
FIG. 20 is a flow chart illustrating a load management process performed by a server system in accordance with an embodiment of the invention.

Turning now to FIG. 20, a load management process that can be performed by an EV charger server system in accordance with an embodiment of the invention is illustrated. The process 2000 can include collecting data about electricity usage (2002). In some embodiments, certain percentage of EV chargers are made unavailable from mobile device schedules (2004) based on electricity usage data. In certain embodiments, the load profile schedule including the current and future charging schedules are sent to the mobile device (2006). In several embodiments, a receipt of actual power consumption information from the EV charger is provided to the EV charger server system so that the server system can compare future usage data that it receives and determine whether the adjustment to the power of the EV charger improved the electricity usage, and determine what adjustment to make in the future.

Figure 21:
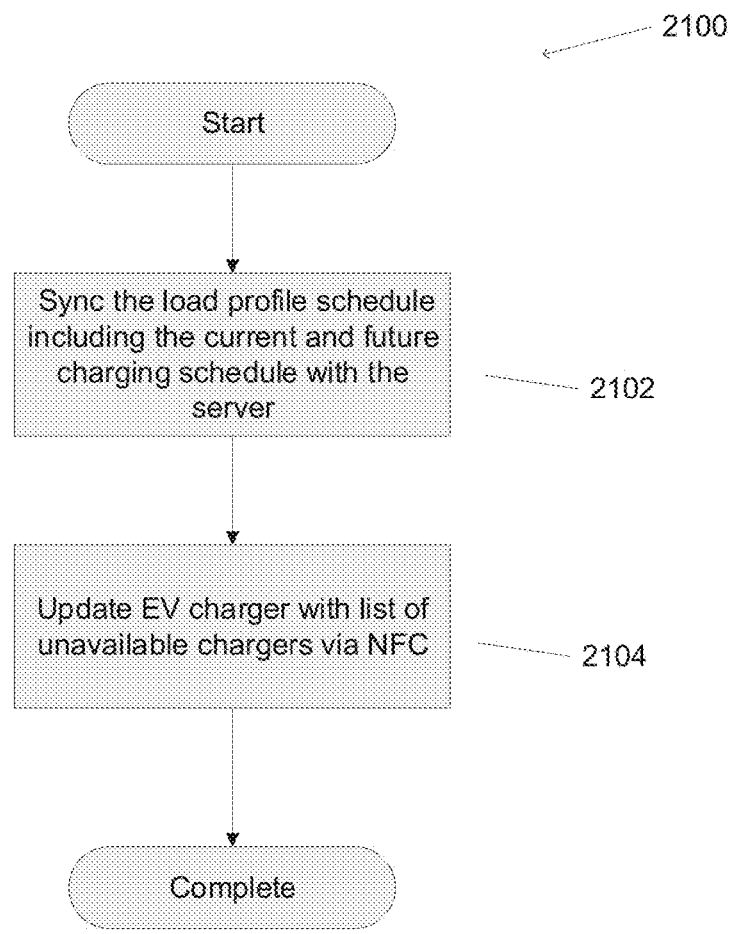
FIG. 21 is a flow chart illustrating a load management process performed by a mobile device in accordance with an embodiment of the invention.

Turning now to FIG. 21, a load management process for a mobile device in accordance with an embodiment of the invention is illustrated. Process 2100 includes receiving the load profile schedule including the current and future charging schedules from the server system (2102). The EV charger is updated via NFC with a list of unavailable chargers (2104). In some embodiments, the EV chargers might be networked. In several embodiments, a single EV charger might communicate with a mobile device and then distribute data to other EV chargers.

While specific load management processes are described above with reference to FIGS. 19-21, any of a variety of load management processes can be utilized to provide load management information to EV chargers that lack direct network connections with power management server systems and enable the EV chargers to modify the manner that they deliver power to EVs in response to changes in network demand as appropriate to the requirements of specific applications in accordance with various embodiments of the invention. Systems for secure EV charging with networks are discussed below.

Systems for Secure EV Charging with Networks

Figure 22:
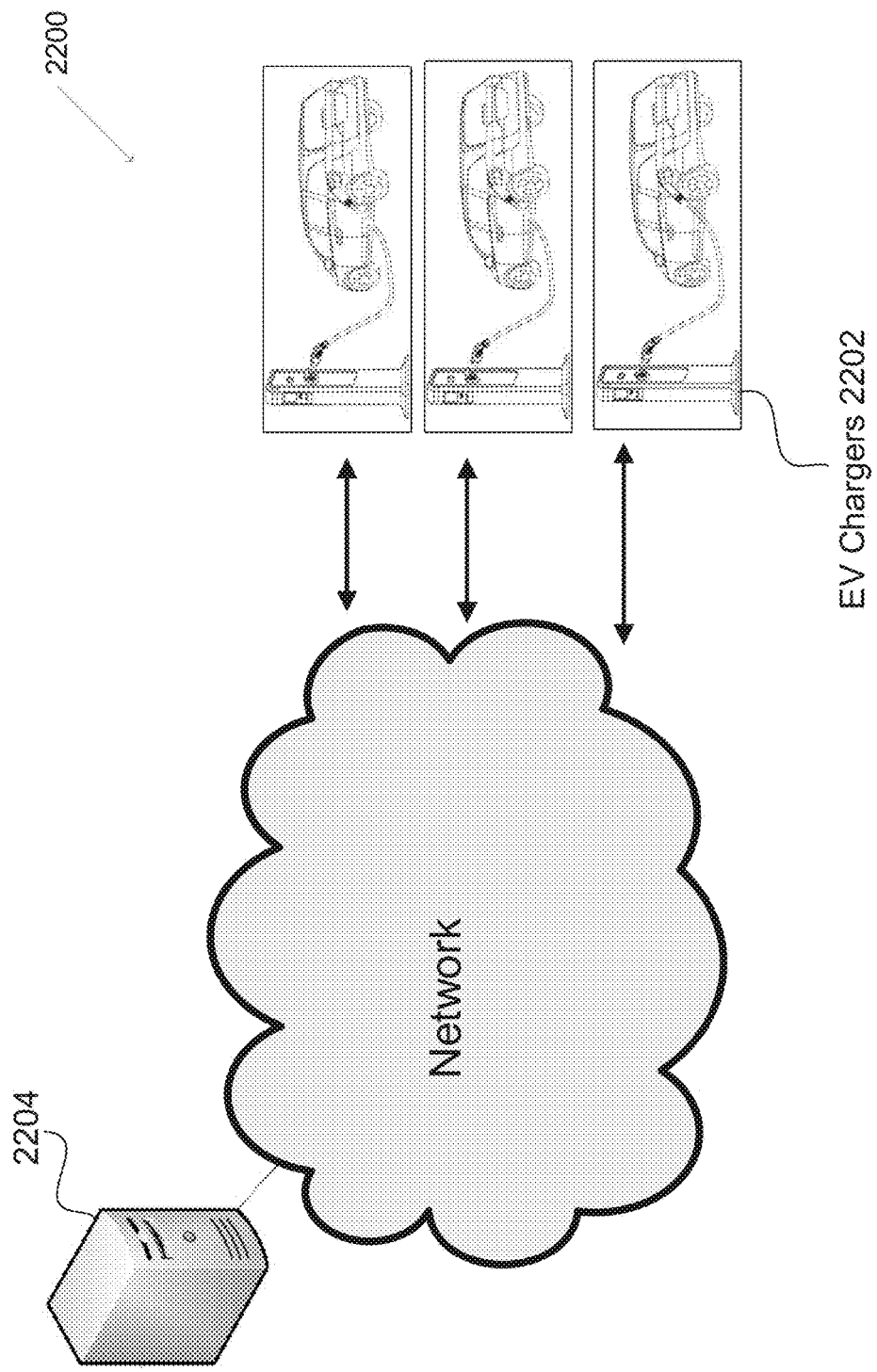
FIG. 22 illustrates an overview of a system for secure electric vehicle charging, where an EV charger possesses a network connection in accordance with an embodiment of the invention.

A system diagram 2200 in accordance with an embodiment of the invention is shown in FIG. 22. EV chargers 2202 can communicate with a server 2204 via network connection. Server 2204 can include a charging protocol, for example open charge point protocol (OCPP). This protocol enables communication between the server and the EV chargers 2202 devices. The server can enable authentication of users by verifying the users against a list of users maintained on the server 2202.

While specific system for secure EV charging are described above with reference to FIG. 22, any of a variety of systems can be utilized to provide secure EV charging as appropriate to the requirements of specific applications including authentication of users against a list of users in accordance with various embodiments of the invention. Additional applications are discussed below.

Additional Applications

While the systems and processes described above have been discussed in the context of EV chargers, systems and methods in accordance with embodiments of the invention can be utilized to provide authentication, secure data transfer, firmware updates, and gathering of session data in any of a variety of contexts involving communication between two devices, where an Internet connection is unavailable, intermittently available, and/or only available to one of the devices. For example, systems and methods described herein can be used to authenticate electric scooters, where there may be no Internet connections available for authentication. As another example, systems and methods described herein can be used to authenticate real estate access controls using short range point-to-point communication systems such as NFC, where there may be no Internet connections available for authentication.

Systems and methods in accordance with embodiments of the invention can be utilized to provide access control system for any kind of asset. These assets could also have a need for authorization, authentication, payment, and log of session data to coordinate payment. Specific examples can include micro-mobility, ride sharing, common areas in a community setting, fitness areas, private real estate units, and assets used in a sharing economy, for example real estate assets used in Airbnb. Other examples can include vending machine application, washers and dryers in a shared apartment environment, where systems and methods described herein can be used to enable payment with a non-internet connected device. Systems and methods described herein can also be used in some settings to provide a mobile payment without having a network connection, where the cost of maintaining the network connection can be high.

In several embodiments, processes similar to those described herein can be utilized in applications including (but not limited to) security and access control applications. For example, in some settings multiple people are able to use a "key" at the same time. Another example is where everyone having access to an area must be able to provide a token to the access control system. In other examples, this can also apply where one needs to have a single control that has multiple ports on a charger. For example, you would need to be able to permit many people to authenticate and start charging on a system that controls multiple ports for charging.

While the above descriptions and associated figures have depicted systems and methods for secure EV charging, it should be clear that any of a variety of configurations for systems and methods for secure EV charging can be implemented in accordance with embodiments of the invention. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A system for electric vehicle (EV) charging, the system comprising:
    an EV charger comprising a power management unit, a processor, a low power short range point-to-point communication system, and a memory containing an authentication software application, the EV charger not having an internet connection available, the EV charger is configured to communicate with a first mobile device and a second mobile device through the low power short range point-to-point communication system,
    wherein the first mobile device and the second mobile device each include an authentication application capable of generating a user interface and are each associated with a different user account, and
    wherein the processor is configured by the authentication software application to:
        authenticate the first mobile device via the low power short range point-to-point communication system in part by sending encrypted EV charger access credentials to the first mobile device, receive a first digital token from the first mobile device, wherein the first digital token is associated with a first user account, verify the first digital token, initiate a first charging session based upon a command contained within the first digital token, end the first charging session, and store, in the memory, first charging session data for the first charging session, wherein the first digital token is encrypted using a public key and is self-authenticating without use of an internet connection; and
        authenticate a second mobile device via the low power short range point-to-point communication system, receive a second digital token from the second mobile device, wherein the second digital token is associated with a second user account, verify the second digital token, cause the storing the first charging session data on the second mobile device for forwarding, initiate a second charging session, end the second charging session, store, in the memory, second charging session data for the second charging session, wherein the internet connection is not available to the second mobile device when the first charging session data is received by the second mobile device, and use the authentication application on the second mobile device to send the first charging session data to a server system via an internet connection of the second mobile device when the internet connection becomes available on the second mobile device.

2. The system of claim 1, the processor of the EV charger is further configured by the authentication software application to cause the first charging session data to be sent to the second mobile device via the low power short range point-to-point communication system.

3. The system of claim 1, wherein the low power short range point-to-point communication system is a near field communication (NFC) system.

4. The system of claim 1, wherein the EV charger access credentials comprise charger ID, time of day, and session time.

5. The system of claim 1, wherein the processor is further configured by the authentication software application to:
    receive the authentication request from the first mobile device via the low power short range point-to-point communication system.

6. The system of claim 1, wherein verifying the first digital token includes decrypting the first digital token using cryptographic information contained within a digital certificate stored on the EV charger.

7. The system of claim 1, wherein the first digital token is bound to a specific time period.

8. The system of claim 1, wherein the processor is further configured by the authentication software application to receive a communication from the first mobile device to end the first charging session.

9. The system of claim 8, wherein the processor is further configured by the authentication software application to decrypt the communication and to end the first charging session.

10. The system of claim 9, wherein:
    the EV charger further comprises a locking mechanism, and
    the processor is further configured by the authentication software application to release the locking mechanism upon ending the first charging session.

11. The system of claim 1, wherein the processor is further configured by the authentication software application to cause the storing of the first charging session data on the first mobile device for forwarding when a communication is received to end the first charging session.

12. The system of claim 11, wherein the processor is further configured by the authentication software application to send the first charging session data to a server system via an internet connection of the first mobile device.

13. The system of claim 11, wherein the processor is further configured by the authentication software application to decrypt the communication to end the first charging session and end the first charging session.

14. The system of claim 1, wherein the processor is further configured by the authentication software application to send the first charging session data to another EV charger for forwarding.

15. A system for electric vehicle (EV) charging, the system comprising:
an EV charger comprising a power management unit, a processor, a low power short range point-to-point communication system, and a memory containing an authentication software application, the EV charger not having an internet connection available, the EV charger is configured to communicate with a first mobile device and a second mobile device through the low power short range point-to-point communication system,
wherein the first mobile device and the second mobile device each include an authentication application capable of generating a user interface and are each associated with a different user account, and
wherein the processor is configured by the authentication software application to:
authenticate the first mobile device via the low power short range point-to-point communication system in part by sending encrypted EV charger access credentials to the first mobile device, receive a first digital token from the first mobile device, wherein the first digital token is associated with a first user account, verify the first digital token, initiate a first charging session based upon a command contained within the first digital token, end the first charging session, and store, in the memory, first charging session data for the first charging session; and
authenticate a second mobile device via the low power short range point-to-point communication system, receive a second digital token from the second mobile device, wherein the second digital token is associated with a second user account, verify the second digital token, cause the storing of at least the first charging session data on the second mobile device for forwarding by the authentication application of the second mobile device when an internet connection becomes available on the second mobile device, initiate a second charging session based upon a command contained within the second digital token, end the second charging session, and store, in the memory, second charging session data for the second charging session, wherein the internet connection is not available to the second mobile device when the first charging session data is received by the second mobile device.

16. The system of claim 15, wherein the processor is further configured by the authentication software application to: use the authentication application on the second mobile device to send the first charging session data and the second charging session data to a server system via an internet connection of the second mobile device when the internet connection becomes available on the second mobile device.

17. The system of claim 15, wherein the processor of the EV charger is further configured by the authentication software application to cause the first charging session data to be sent to the second mobile device via the low power short range point-to-point communication system.

18. The system of claim 17, wherein the sending of the first charging session data and the second charging session data to the second mobile device occurs at the end of the second charging session.

19. The system of claim 15, wherein the low power short range point-to-point communication system is a near field communication (NFC) system.

20. The system of claim 15, wherein the EV charger access credentials comprise charger ID, time of day, and session time.

21. The system of claim 15, wherein the processor is further configured by the authentication software application to:
receive an authentication request from the first mobile device via the low power short range point-to-point communication system.

22. The system of claim 15, wherein verifying the first digital token includes decrypting the first digital token using cryptographic information contained within a digital certificate stored on the EV charger.

23. The system of claim 15, wherein the first digital token is bound to a specific time period.

24. The system of claim 15, wherein the first charging session data and/or the second charging session data comprise duration of the charging session, energy used during the charging session, a plug-in status, a status of the EV charger, diagnostics data, temperature data, and humidity data.

25. The system of claim 15, wherein the first mobile device and the second mobile device are the same mobile device.

26. The system of claim 15, wherein the first digital token is encrypted using a public key.

27. The system of claim 15, wherein the first digital token is self-authenticating without use of an internet connection.

28. A system for electric vehicle (EV) charging, the system comprising:
an EV charger comprising a power management unit, a processor, a low power short range point-to-point communication system, and a memory containing an authentication software application, the EV charger not having an internet connection available, the EV charger is configured to communicate with a first mobile device and a second mobile device through the low power short range point-to-point communication system,
wherein the first mobile device and the second mobile device each include an authentication application capable of generating a user interface and are each associated with a different user account, and
wherein the processor is configured by the authentication software application to:
receive an authentication request from the first mobile device via the low power short range point-to-point communication system, authenticate the first mobile device via the low power short range point-to-point communication system in part by sending encrypted EV charger access credentials to the first mobile device, receive a first digital token from the first mobile device, wherein the first digital token is associated with a first user account, verify the first digital token by decrypting the first digital token using cryptographic information contained within a digital certificate, initiate a first charging session based upon a command contained within the first digital token, end the first charging session, and store, in the memory, first charging session data for the first charging session, wherein the digital token is bound to a specific time period, is encrypted using a public key, and is self-authenticating without use of an internet connection; and authenticate a second mobile device via the low power short range point-to-point communication system, receive a second digital token from the second mobile device, wherein the second digital token is associated with a second user account, verify the second digital token, cause the first charging session data to be sent to the second mobile device via the low power short range point-to-point communication system, initiate a second charging session, end the second charging session, store, in the memory, second charging session data for the second charging session, wherein the internet connection is not available to the second mobile device when the first charging session data is received by the second mobile device, and use the authentication application on the second mobile device to send the first charging session data to a server system via an internet connection of the second mobile device when the internet connection becomes available on the second mobile device.

29. The system of claim 15, wherein the authentication application of the second mobile device on the second mobile device authenticates to the server using credentials associated with the second account and provides the charging session data from the first session which the server associates with the first user account.

* * * * *